United States Patent
Low et al.

(10) Patent No.: US 9,954,362 B2
(45) Date of Patent: Apr. 24, 2018

(54) SYSTEMS AND METHODS FOR OPTIMAL POWER FLOW ON A RADIAL NETWORK

(71) Applicant: California Institute of Technology, Pasadena, CA (US)

(72) Inventors: Steven H. Low, La Canada (CA); Qiuyu Peng, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 262 days.

(21) Appl. No.: 14/722,075

(22) Filed: May 26, 2015

(65) Prior Publication Data

US 2015/0340863 A1 Nov. 26, 2015

Related U.S. Application Data

(60) Provisional application No. 62/002,697, filed on May 23, 2014.

(51) Int. Cl.
| | |
|---|---|
| *H02J 3/00* | (2006.01) |
| *G05B 15/02* | (2006.01) |
| *G06F 17/10* | (2006.01) |
| *H04L 12/64* | (2006.01) |
| *G05B 13/04* | (2006.01) |

(52) U.S. Cl.
CPC ........... *H02J 3/00* (2013.01); *G05B 15/02* (2013.01); *G06F 17/10* (2013.01); *H04L 12/6418* (2013.01)

(58) Field of Classification Search
USPC ........................................ 700/286
See application file for complete search history.

(56) References Cited

U.S. PATENT DOCUMENTS

| | | |
|---|---|---|
| 2012/0316691 A1 | 12/2012 | Boardman et al. |
| 2013/0274941 A1 | 10/2013 | Khozikov et al. |

FOREIGN PATENT DOCUMENTS

| | | |
|---|---|---|
| WO | 2015179873 A1 | 11/2015 |

OTHER PUBLICATIONS

Kraning et al., "Dynamic Network Energy Management via Proximal Message Passing" Foundations and Trends in Optimization vol. 1, No. 2 (2013) pp. 70-122.*

(Continued)

*Primary Examiner* — Emilio J Saavedra
(74) *Attorney, Agent, or Firm* — KPPB LLP

(57) ABSTRACT

Node controllers and power distribution networks in accordance with embodiments of the invention enable distributed power control. One embodiment includes a node controller including a distributed power control application; a plurality of node operating parameters describing the operating parameter of a node and a set of at least one node selected from the group consisting of an ancestor node and at least one child node; wherein send node operating parameters to nodes in the set of at least one node; receive operating parameters from the nodes in the set of at least one node; calculate a plurality of updated node operating parameters using an iterative process to determine the updated node operating parameters using the node operating parameters that describe the operating parameters of the node and the set of at least one node, where the iterative process involves evaluation of a closed form solution; and adjust node operating parameters.

22 Claims, 12 Drawing Sheets

(56) References Cited

OTHER PUBLICATIONS

Taylor et al., "Convex models of distribution system reconfiguration" IEEE Transactions on Power Systems, vol. 6, No. 1, Jan. 2007 pp. 1407-1413.*
Phan et al., "Distributed Methods for Solving the Security-Constrained Optimal Power Flow Problem" IEEE PES Innovative Smart Grid Technologies (ISGT), 2012, Jan. 16-20, 2012, 7 Pgs.*
International Preliminary Report on Patentability for International Application PCT/US2015/032482, Report issued Nov. 29, 2016, dated Dec. 8, 2016, 12 Pgs.
Bai et al., "Semidefinite programming for optimal power flow problems", Electrical Power and Energy Systems, 2008, vol. 30, pp. 383-392.
Baldick, R. et al., "A fast distributed imple-mentation of optimal power flow", IEEE Transactions on Power Systems, vol. 14, Issue 3, Aug. 1999, pp. 858-864.
Boyd et al., "Distributed Optimization and Statistical Learning via the Alternating Direction Method of Multipliers", Foundations and Trends in Machine Learning, vol. 3, No. 1, 2010, pp. 1-122.
Dall'Anese et al., "Distributed Optimal Power Flow for Smart Microgrids", IEEE Transactions on Smart Grid, arXiv:1211.5856v5, Jan. 25, 2014, Retrieved from the Internet: http://arxiv.org/pdf/1211.5856.pdf>, pp. 1-11.
Devane, E. et al., "Stability and convergence of distributed algorithms for the OPF problem", 52nd IEEE Conference on Decision and Control, Dec. 10-13, 2013, Florence, Italy, pp. 2933-2938.
Farivar, M. et al., "Branch flow model: relaxations and convexification (parts I, II)", IEEE Trans. on Power Systems, vol. 28, No. 3, Aug. 2013, pp. 2554-2572.
Farivar, M. et al., "Inverter VAR control for distribution systems with renewables", In IEEE SmartGridComm, Oct. 17-20, 2011, pp. 457-462.
Gan et al., "Exact Convex Relaxation of Optimal Power Flow in Radial Networks", IEEE Transactions on Automatic Control, vol. 60, Issue 1, Jan. 2015, pp. 72-87.
Gan et al., "Optimal power flow in distribution networks", Proc. 52nd IEEE Conference on Decision and Control, Dec. 2013, in arXiv:12084076, 7 pgs.
Grant, M. et al., "CVX: Matlab software for disciplined convex programming", Apr. 17, 2011, retrieved from http://cvxr.com/cvx/, 2 pages.
Jabr et al., "Radial Distribution Load Flow Using Conic Programming", IEEE Transactions on Power Systems, vol. 21, Issue 3, Aug. 2006, pp. 1458-1459.
Jakobsson, Martin, "On Some Extensions and Performance of Fast-Lipschitz Optimization", Master's Degree Project, Stockholm, Sweden, Oct. 2011, Retrieved from the Internet: <http://www.diva-portal.org/smash/get/diva2:471914/FULLTEXT01.pdf>, 84 pages.
Kim, B. H. et al., "Coarse-grained distributed optimal power flow", IEEE Transactions on Power Systems, vol. 12, Issue 2, May 1997, pp. 932-939.
Lam, A. et al., "Optimal Distributed Voltage Regulation in Power Distribution Networks", arXiv:1204.5226, Apr. 23, 2012, retrieved from https://arxiv.org/abs/1204.5226v1, 24 pages.
Lam et al., "Distributed algorithms for optimal power flow problem", Decision and Control (CDC), 2012 IEEE 51st Annual Conference on IEEE, 2012, pp. 430-437.
Li, N. et al., "Demand response in radial distribution networks: Distributed algorithm", 2012 Conference Record of the Forty Sixth Asilomar Conference on Signals, Systems and Computers (ASILOMAR), Nov. 4-7, 2012, Pacific Grove, CA, USA, pp. 1549-1553.
Low, "Convex relaxation of optimal power flow—II: exactness", IEEE Trans. on Control of Network Systems, vol. 1, No. 2, Jun. 2014, pp. 177-189.
Low, "Convex Relaxation of Optimal Power Flow; Part I: Formulations and Equivalence", IEEE Trans. on Control of Network Systems, Apr. 15, 2014, vol. 1, No. 1, 44 pgs., Retrieved from the Internet: <http://arxiv.org/pdf/1405.
Peng et al., "Distributed algorithm for optimal power flow on a radial network", 53rd IEEE Conference on Decision and Control, Dec. 15-17, 2014, Los Angeles, CA, USA, pp. 167-172.
Peng et al., "Feeder Reconfiguration in Distribution Networks Based on Convex Relaxation of OPF", IEEE Transactions on Power Systems, vol. 30, Issue 4, Jul. 2015, pp. 1793-1804.
Srinivasa et al., "HERB: a home exploring robotic butler", Autonomous Robots, vol. 28, 2010, pp. 5-20.
Sun, A. X. et al., "Fully decentralized AC optimal power flow algorithms", 2013 IEEE Power & Energy Society General Meeting, Jul. 21-25, 2013, Vancouver, BC, Canada, pp. 1-5.

* cited by examiner

1100

Distributed Process of Optimal Power Flow

Input: network $T$, power injection region $S_i$, voltage region $(\underline{v}_i, \bar{v}_i)$, line impedance $z_i$

Output: voltage $v$, power injection $s$

1. Initialize the variables with any number.
2. Iterate the following step until a threshold.
    a. $x$-update: each agent $i$ solves (14) to update $x$.
    b. $z$-update: each agent $i$ solves (16) to update $z$.
    c. multiplier update: update $\lambda, \mu, \gamma$ by (8c).

SYSTEMS AND METHODS FOR OPTIMAL POWER FLOW ON A RADIAL NETWORK

CROSS-REFERENCE TO RELATED APPLICATIONS

The present invention claims priority to U.S. Provisional Patent Application Ser. No. 62/002,697 entitled "Distributed Algorithm of Optimal Power Flow Problem on a Radial Network" to Peng et al., filed May 23, 2014. The disclosure of U.S. Provisional Patent Application Ser. No. 62/002,697 is herein incorporated by reference in its entirety.

STATEMENT OF FEDERALLY SPONSORED RESEARCH

This invention was made with government support under Grant No. DE-AR0000226 awarded by the U.S. Department of Energy and Grant No. CNS0911041 awarded by the National Science Foundation. The government has certain rights in the invention.

FIELD OF THE INVENTION

The present invention generally relates to optimal power flow and more specifically to a closed form iterative processes for solving for optimal power flow.

BACKGROUND

An incredible amount of infrastructure is relied upon to transport electricity from power stations, where the majority of electricity is currently generated, to individual homes. Power stations can generate electricity in a number of ways including using fossil fuels or using renewable sources of energy such as solar, wind, and hydroelectric sources. Once electricity is generated it travels along transmission lines to substations. Substations typically do not generate electricity, but can change the voltage level of the electricity as well as provide protection to other grid infrastructure during faults and outages. From here, the electricity travels over distribution lines to bring electricity to individual homes. The infrastructure used to transport electricity through the power grid can be viewed as a graph comprised of nodes and lines. The power stations, substations, and any end user can be considered nodes within the graph. Transmission and distribution lines connecting these nodes can be represented by lines.

Distributed power generation, electricity generation at the point where it is consumed, is on the rise with the increased use of residential solar panels and is fundamentally changing the path electricity takes to many user's homes. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional locations along the electrical grid.

SUMMARY OF THE INVENTION

Node controllers and power distribution networks in accordance with embodiments of the invention enable distributed power control. One embodiment includes a node controller including: a network interface, a processor, a memory containing: a distributed power control application: a plurality of node operating parameters describing the operating parameter of a node; and a plurality of node operating parameters describing operating parameters for a set of at least one node selected from the group consisting of an ancestor node and at least one child node; wherein the processor is configured by the distributed power control application to: send node operating parameters to nodes in the set of at least one node; receive operating parameters from the nodes in the set of at least one node; calculate a plurality of updated node operating parameters using an iterative process to determine the updated node operating parameters using the node operating parameters that describe the operating parameters of the node, and the operating parameters of the set of at least one node, where each iteration in the iterative process involves evaluation of a closed form solution; and adjust the node operating parameters.

In a further embodiment, the iterative process further includes an alternating direction method of multipliers (ADMM) process.

In another embodiment, the ADMM process further includes an x-update process, wherein the x-update process comprises minimizing an augmented Lagrangian for an augmented Relaxed Optimal Power Flow (ROPF) expression.

In a still further embodiment, the x-update process is subject to the following constraints:

$$v_{A_i,i}^{(l)} = v_i^{(l)} - 2(r_i P_i^{(l)} + x_i Q_i^{(l)}) + \ell_i^{(l)}(r_i^2 + x_i^2)$$

$$\sum_{j \in C_i} (P_{j,i}^{(l)} - \ell_{j,i}^{(l)} r_j) + p_i^{(l)} = P_i^{(l)}$$

$$\sum_{j \in C_i} (Q_{j,i}^{(l)} - \ell_{j,i}^{(l)} x_j) + q_i^{(l)} = Q_i^{(l)}$$

where v is a complex voltage, r is a real portion and x is an imaginary portion of a complex impedance, P is a real portion and Q is an imaginary portion of a branch power flow, l is a magnitude squared of the complex branch current, l is the a layer number, $C_i$ is a set of child nodes, i is the node, j is the child node, and $A_i$ is the ancestor node.

In still another embodiment, the ADMM process further includes a z-update process, wherein the z-update process comprises minimizing an augmented Lagrangian for an augmented Relaxed Optimal Power Flow (ROPF) expression.

In a yet further embodiment, the z-update process further includes calculating a closed form expression of independent subexpression.

In yet another embodiment, the ADMM process further includes a Lagrange multiplier update process, wherein the Lagrange multiplier update expression includes a set of Lagrange multipliers.

In a further embodiment again, each Lagrange multiplier in the set of Lagrange multipliers is evaluated by the processor using the following expression:

$$\lambda^{k+1} = \lambda^k + \rho(Ax^{k+1} + Bz^{k+1} - c)$$

where $\lambda$ is a Lagrange multiplier in the set of Lagrange multipliers, $\rho$ is a constant, $Ax+Bz-c$ is a constraint, k is current iteration, and k+1 is a next iteration.

In another embodiment again, the updated node operating parameters are further calculated using the node operating parameters that describe a set of operating parameters of at least one node selected from the group consisting of an ancestor node of the ancestor node and at least one child node of the at least one child node.

In a further additional embodiment, the node operating parameters include power injection, voltage, branch current to the ancestor node, and branch power flow to the ancestor node In another additional embodiment, a power distribution network including: one or more centralized computing systems; a communications network: a plurality of node controllers, wherein each node controller in the plurality of node controllers contains: a network interface; a node processor; and a memory containing: a distributed power control application: a plurality of node operating parameters describing the operating parameters of a node; and a plurality of node operating parameters describing operating parameters for a set of at least one node selected from the group consisting of an ancestor node and at least one child node; wherein the node processor is configured by the distributed power control application to: send node operating parameters to nodes in the set of at least one node; receive operating parameters from the nodes in the set of at least one node; calculate a plurality of updated node operating parameters using an iterative process to determine the updated node operating parameters using the node operating parameters that describe the operating parameters of the nodes, and the operating parameters of the nodes in the set of at least one node, where each iteration in the iterative process involves evaluation of a closed form solution; and adjust the node operating parameters.

In a still yet further embodiment, the iterative process is part of a distributed process for achieving Optimal Power Flow (OPF) that is simplified using a convex relaxation.

In still yet another embodiment, the node controllers are modeled in the centralized computing system as a radial network.

In a still further embodiment again, the node controllers are modeled in the centralized computing system using Kirchhoff's laws.

In still another embodiment again, the node controllers are modeled in the centralized computing system using a branch flow model.

Another further embodiment of the method of the invention includes: the ADMM process further includes an x-update process, wherein the x-update process includes minimizing an augmented Lagrangian for an augmented Relaxed Optimal Power Flow (ROPF) expression.

Still another further embodiment of the method of the invention includes: the x-update process is subject to the following constraints:

$$v_{A_i,i}^{(l)} = v_i^{(l)} - 2(r_i P_i^{(l)} + x_i Q_i^{(l)}) + \ell_i^{(l)}(r_i^2 + x_i^2)$$

$$\sum_{j \in C_i} (P_{j,i}^{(l)} - \ell_{j,i}^{(l)} r_j) + p_i^{(l)} = P_i^{(l)}$$

$$\sum_{j \in C_i} (Q_{j,i}^{(l)} - \ell_{j,i}^{(l)} x_j) + q_i^{(l)} = Q_i^{(l)}$$

where v is a complex voltage, r is a real portion and x is an imaginary portion of a complex impedance, P is a real portion and Q is an imaginary portion of a branch power flow, l is a magnitude squared of the complex branch current, l is the a layer number, $C_i$ is a set of child nodes, i is the node, j is the child node, and $A_i$ is the ancestor node.

In a further additional embodiment, the ADMM process further includes a z-update process, wherein the z-update process includes minimizing an augmented Lagrangian for an augmented Relaxed Optimal Power Flow (ROPF) expression.

In another additional embodiment, the z-update process further comprises calculating a closed form expression of independent subexpression.

In a still yet further embodiment, the ADMM process further comprises a Lagrange multiplier update process, wherein the Lagrange multiplier update expression comprises a set of Lagrange multipliers.

In still yet another embodiment, each Lagrange multiplier in the set of Lagrange multipliers is evaluated by the processor using the following expression:

$$\lambda^{k+1} = \lambda^k + \rho(Ax^{k+1} + Bz^{k+1} - c)$$

where $\lambda$ is a Lagrange multiplier in the set of Lagrange multipliers, $\rho$ is a constant, $Ax+Bz-c$ is a constraint, k is current iteration, and k+1 is a next iteration.

In a still further embodiment again, the updated node operating parameters are further calculated using the node operating parameters that describe a set of operating parameters of at least one node selected from the group consisting of an ancestor node of the ancestor node and at least one child node of the at least one child node.

In still another embodiment again, the node operating parameters include power injection, voltage, branch current to an ancestor node, and branch power flow to an ancestor node.

BRIEF DESCRIPTION OF THE DRAWINGS

FIG. 11 is pseudocode illustrating a process for distributed power control in accordance with an embodiment of the invention.

DETAILED DESCRIPTION

Figure 1:
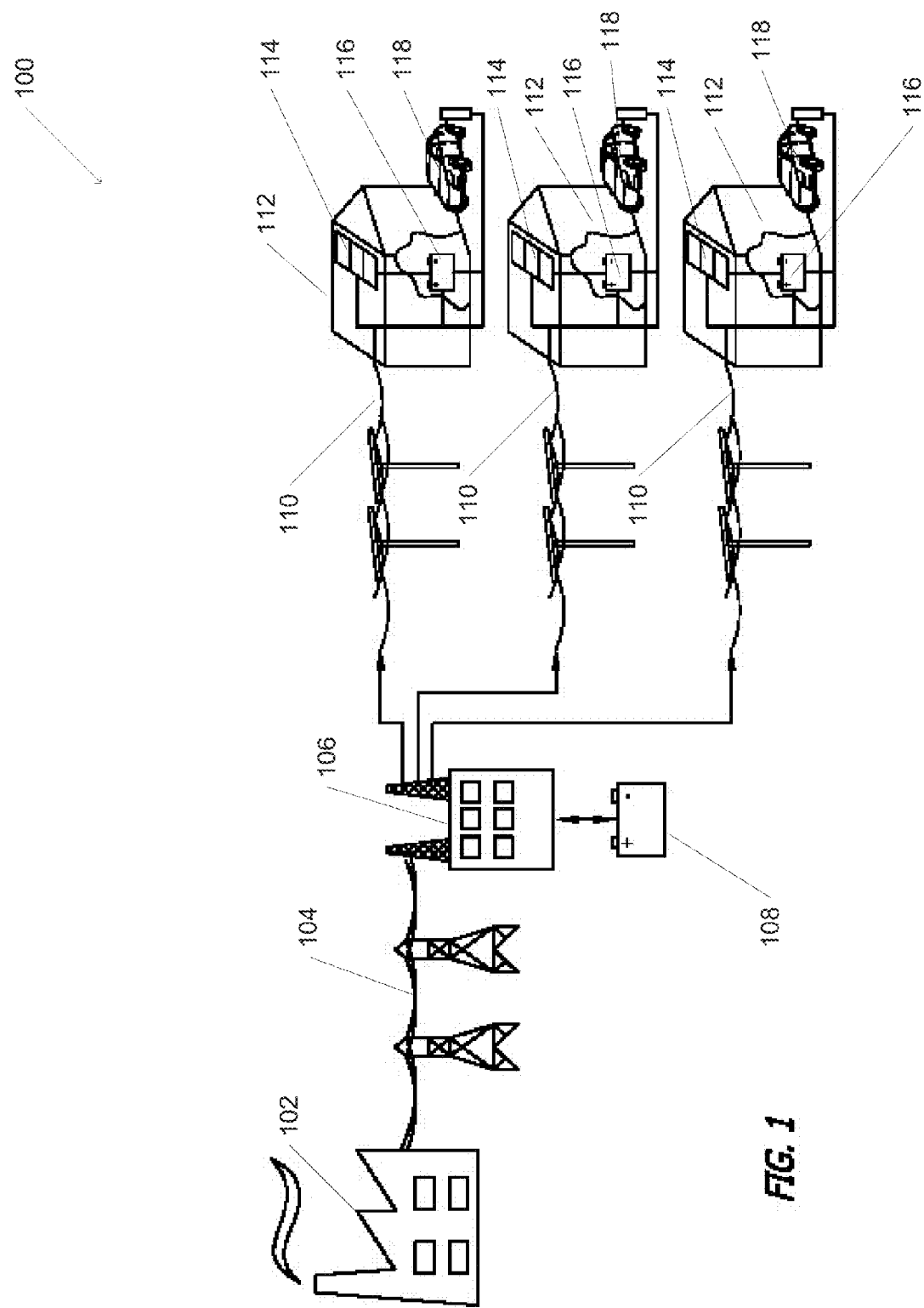
FIG. 1 is a diagram conceptually illustrating a power distribution network in accordance with an embodiment of the invention.

Turning now to the drawings, systems and methods for distributed control of power distribution systems configured as radial networks in accordance with embodiments of the invention are illustrated. Radial networks have a tree topology where each node is connected to a single unique ancestor and a set of unique children and radial networks are commonly utilized in modeling the distribution side of the power grid. In many embodiments, processing nodes are distributed throughout the power distribution network that control power load, distributed power generation, and remote battery storage. In several embodiments, the processing nodes control the operational parameters of aspects of the power distribution network in an effort to achieve what is often referred to as Optimal Power Flow (OPF). Achieving OPF involves optimizing the operation of a power system with respect to one or more objectives. These objectives can include (but are not limited to) minimizing the amount of power lost during the transmission of power to a user, minimizing the cost of generating the power needed for the system, and/or seeking to optimize other general operational constraints.

In a number of embodiments, the processing nodes within the power distribution network perform centralized, distributed, or hybrid processes that coordinate the control of the power distribution network. Centralized processes can use a centralized processing unit to calculate optimal power flow of all nodes within the network. Distributed processes can be based upon messages passed between the processing node and its ancestor and/or child nodes within the radial network. Hybrid processes use a combination of centralized and distributed process steps. In several embodiments, individual processing nodes determine the voltage, power injection, current, and/or impedance of a given power load, distributed power generation, or remote battery storage within the power distribution network by performing a closed form calculation using information received by power and/or child nodes. In many embodiments, the specific closed form calculation utilized by the processing nodes is selected based upon a distributed solution for optimal power flow of the power distribution network obtained using alternating direction method of multipliers (ADMM). Use of a closed form expression obtained in the manner described below can be particularly advantageous relative to techniques for performing distributed control of a power distribution network to achieve OPF requiring the use of an iterative optimization process at each processing node. Specifically, performing a single set of calculations to obtain the control parameters as opposed to repeatedly iterating a set of calculations to obtain the control parameters can be significantly more computationally efficient and can enable the power distribution network to adapt to changes with much lower latency. Additional computational efficiencies may be obtained by a conic relaxation of the distribution network, for example by using a second order cone program (SOCP) relaxation.

Systems and methods for performing distributed control of radial power distribution networks to achieve OPF and solutions to the distributed OPF problem that can be utilized in the implementation of such systems and methods in accordance with embodiments of the invention are discussed further below.

Radial Power Distribution Networks

A power distribution network 100 in accordance with an embodiment of the invention is shown in FIG. 1. Electricity is generated in power generator 102. Power transmission lines 104 can transmit electricity between the power generator and power substation 106. Power substation 106 additionally can connect to large storage battery 108 which temporarily stores electricity, as well as power distribution lines 110. The power distribution lines 110 can transmit electricity from the power substation to homes 112. The homes can include solar panels 114, a house battery 116, and/or an electric car 118. Power distribution networks can transmit electricity in many ways. When alternating current is used, voltage reverses direction at regular intervals. When only one voltage source is used, the power distribution network is described as single phase. When several sources are used, and the sources are distributed in equally spaced regular intervals (typically 120 degrees for a commonly used three phase network), the power distribution network is described as multiphase balanced network. Single phase and multiphase balanced network problems can often be solved with similar analysis. In the discussions to follow, networks that distribute power in a single phase or a multiphase balanced manner will both be referred to single phase networks. An alternative method of distributing power is multiphase unbalanced. In this manner of power distribution, several voltage sources are unevenly spaced. Multiphase unbalanced networks often require a different analysis than single phase networks and will be referred to as multiphase networks.

The power generator 102 can represent a power source including those using fossil fuels, nuclear, solar, wind, or hydroelectric power. Substation 106 changes the voltage of the electricity for more efficient power distribution. Solar panels 114 are distributed power generation sources, and can generate power to supply the home as well as generate additional power for the power grid. House battery 116 can store excess electricity from the solar panels to power the home when solar energy is unavailable, or store electricity from the power grid to use at a later time. Substations 106, large storage batteries 108, homes 112, solar panels 114, house batteries 116, and electric cars 118 can all be considered to be nodes within the power distribution network and the distribution lines 110 can be considered to be lines within the power distribution network. In combination, the nodes and lines form a radial network. In many embodiments, node controllers are located at nodes throughout the network to control the operating parameters of different nodes to achieve OPF. The type of control utilized can depend on the specifics of the network and may include distributed, centralized, and/or hybrid power control. Although many different systems are described above with reference to FIG. 1, any of a variety of power distribution network including node controllers may be utilized to perform power distribution as appropriate to the requirements of specific applications in accordance with embodiments of the invention. Nodes utilizing node controllers connected to a communication network in accordance with various embodiments of the invention are discussed further below.

Node Controller Architectures

Figure 2:
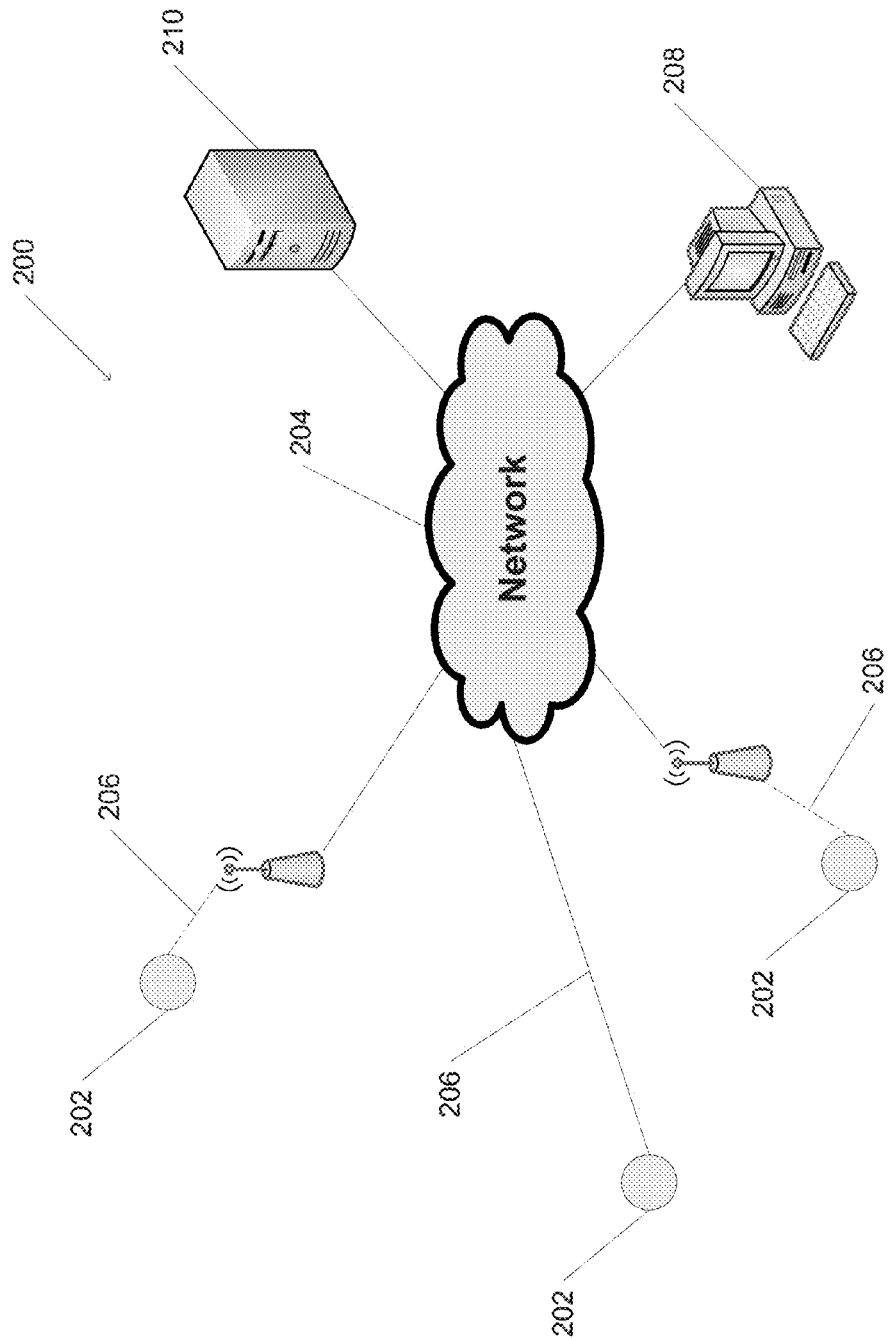
FIG. 2 is a diagram conceptually illustrating nodes utilizing node controllers connected to a communication network in accordance with an embodiment of the invention.

A system 200 including nodes utilizing node controllers connected to a communication network in accordance with an embodiment of the invention are shown in FIG. 2. Nodes 202 can connect to communication network 204 using a wired and/or wireless connection 206. In some embodiments the power distribution network can act in place of the communication network. The communication network may also be connected to one or more centralized computers 208 to monitor calculations made by or to send instructions to multiple nodes to, for example, control power distribution in the network at a global level. Additionally, in many embodiments a database management system 210 can be connected to the network to track node data which, for example, may be used to historically track power usage at various locations over time. Although many systems are described above with reference to FIG. 2, any of a variety of systems can be utilized to perform connecting nodes to a network as appropriate to the requirements of specific applications in accordance with embodiments of the invention. Node controllers in accordance with various embodiments of the invention are discussed further below.

Figure 3:
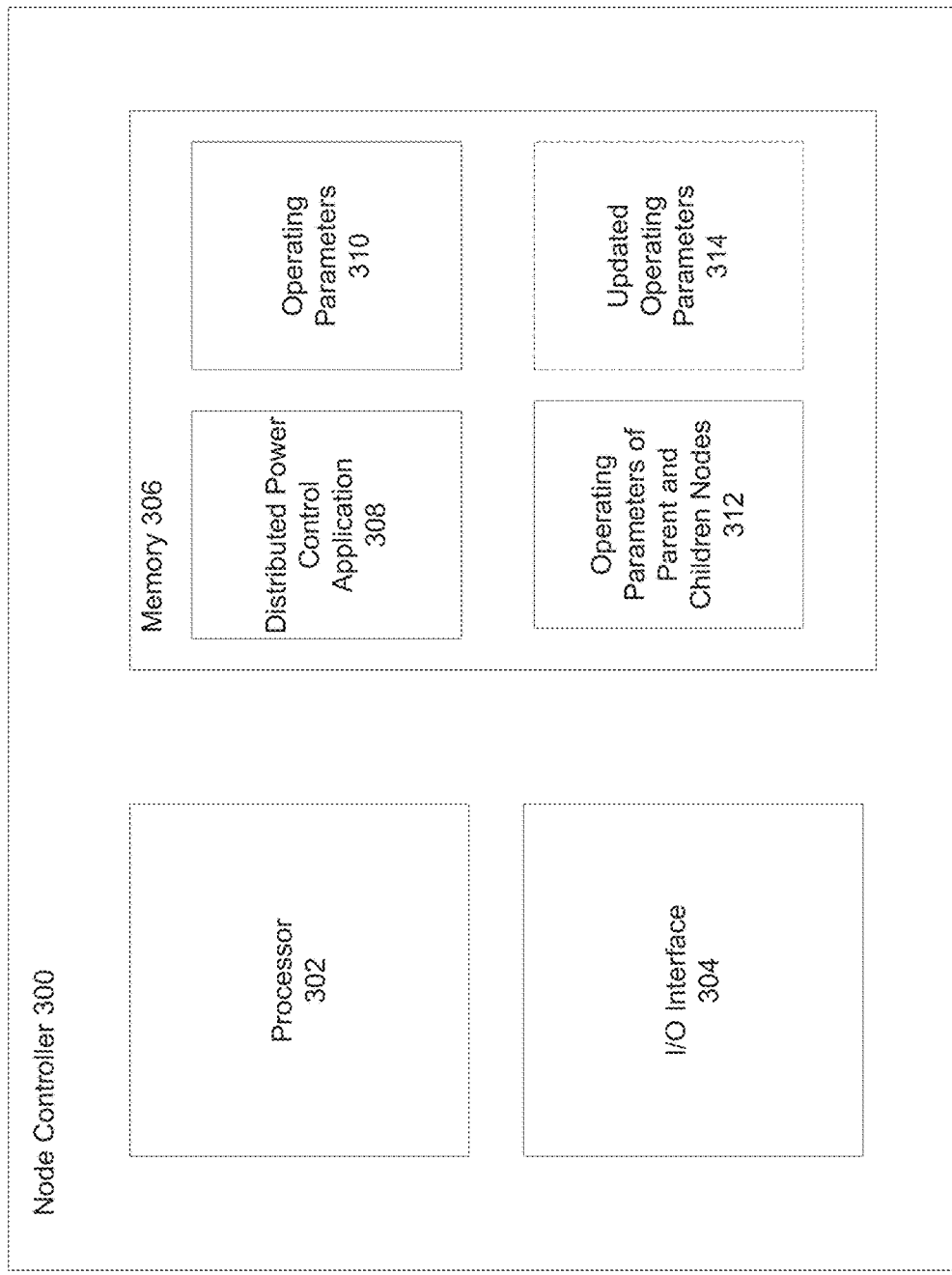
FIG. 3 is a block diagram of a node controller in accordance with an embodiment of the invention.

A node controller in accordance with an embodiment of the invention is shown in FIG. 3. In various embodiments, node controller 300 can perform calculations in a distributed manner at a node in the radial network. The node controller includes at least one processor 302, an I/O interface 304, and memory 306. The at least one processor 302, when configured by software stored in memory, can perform calculations on and make changes to data passing through the I/O interface as well as data stored in memory. In many embodiments, the memory 306 includes software including the distributed power control application 308 as well as operating parameters 310, operating parameters of ancestor and children nodes 312, and updated operating parameters 314. A node can calculate updated operating parameters by using a combination of its own node operating parameters, and/or operating parameters received through the I/O interface from its ancestor and children nodes, and/or operating parameters received from a centralized computer in the case of a centralized or hybrid approach. The distributed power control application 308 will be discussed in greater detail below and can enable the node to perform calculations to solve for optimal power flow in a distributed manner. These distributed calculations performed on the current operating parameters can specifically involve evaluating a closed form expression when solving for optimal power flow. Various operating parameters of a node that can be controlled by a node controller are also discussed further below, and may include (but are note limited to) node voltage, current, impedance, and power injection. Although a number of different node controller implementations are described above with reference to FIG. 3, any of a variety of computing systems can be utilized to control a node within a power distribution system as appropriate to the requirements of specific applications in accordance with various embodiments of the invention. As noted above, node controllers in accordance with many embodiments of the invention can control the operation of nodes within a radial power distribution network in such a way as to approach OPF. Use of node controllers to implement OPF in a distributed manner within a radial network in accordance with various embodiments of the invention are discussed further below.

Use of Node Controllers to Achieve Optimal Power Flow

Node controllers in accordance with many embodiments of the invention utilize processes that control nodes in a manner that attempts to achieve OPF in a computationally efficient manner. In order to do this, a closed form expression has been developed enabling calculations to performed at each node concurrently. The term 'closed form expression' refers to a calculation that can be performed in a finite number of operations. Overall the closed form solution for OPF can be more computationally efficient and predictable to compute than the use of an iterative process by a node controller to determine operating parameters. Various models can be used to develop a closed form solution that can be utilized to achieve OPF in a distributed manner.

The branch flow model (BFM) and the bus injection model (BIM) can be used for solving the OPF problem. The BFM focuses on the current and power in the branches of the model, and the BIM focuses of current, voltage, and power injection at the nodes of the model. Although the BFM and the BIM are generated with different sets of equations and variables, they produce related solutions since they are both modeled based on Kirchhoff's laws. The process utilized by the processing nodes in accordance with various embodiments of the invention utilizes calculations determined by the BFM. Many network shapes can be used to construct the BFM, such as a radial network. In certain cases the structure of a radial network can simplify the computations of the power equations in the OPF problem. Additionally, a convex relaxation of the model can further simplify the calculations. An approach to solve OPF in a distributed closed form manner using a second order cone program (SOCP) conic relaxation is described in detail below. As can readily be appreciated, any of a variety of techniques that can be utilized to solve the OPF in a distributed closed form manner can be utilized as the basis for configuring node controllers as appropriate to the requirements of specific applications in accordance with various embodiments of the invention. Therefore, the inventions described herein should not be considered to be limited to the specific closed form expressions discussed below.

Branch Flow Model

Figure 4:
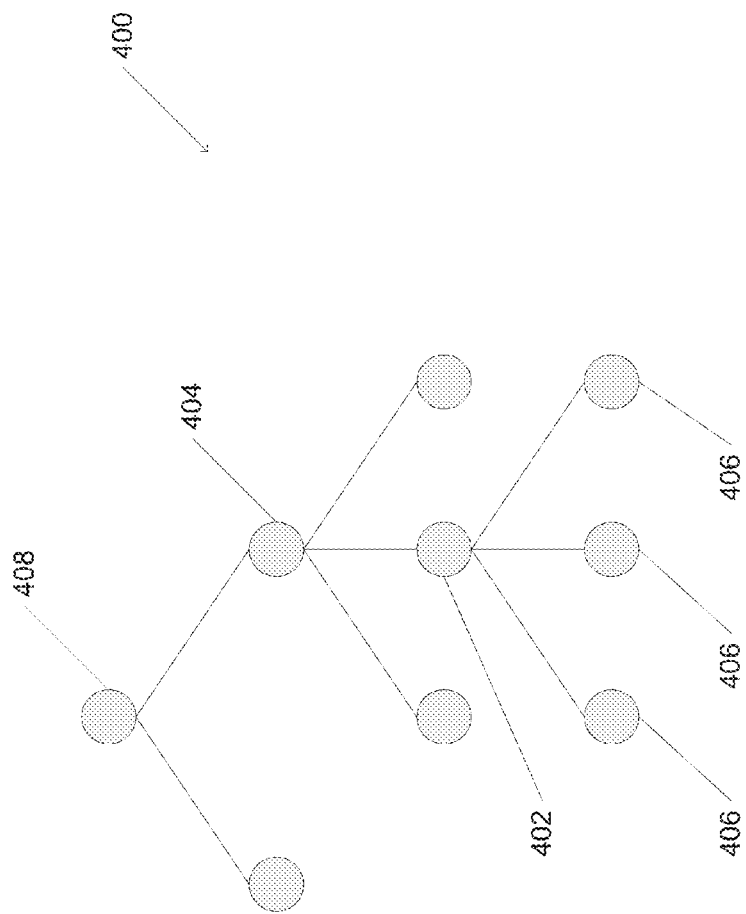
FIG. 4 is diagram illustrating a radial network in accordance with an embodiment of the invention.

A radial network in accordance with an embodiment of the invention is shown in FIG. 4. In various embodiments, radial network 400 includes a node 402. Node 402 has an ancestor node 404 and one or more children nodes 406. A radial network also has a unique root node 408. A detailed discussion of these nodes is discussed further below. Although many radial networks are described above with reference to FIG. 3, any of a variety of network configurations can be utilized as the network shape as appropriate to the requirements of specific applications in accordance with embodiments of the invention. The relationship between nodes and operation parameters in a BFM is discussed further below.

Figure 5:
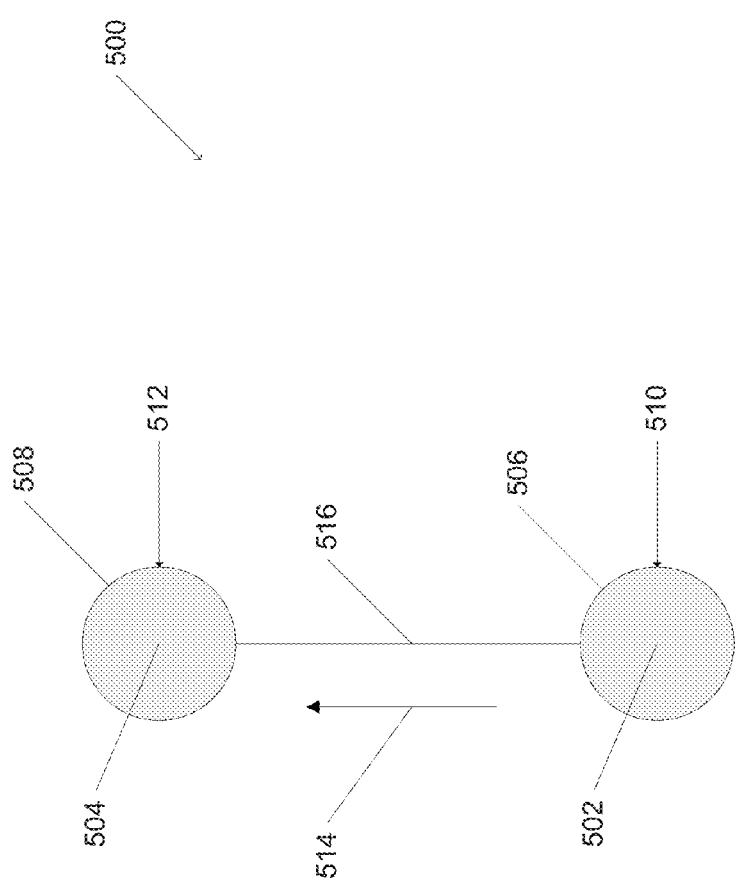
FIG. 5 is a diagram illustrating a relationship between nodes and operating parameters in a branch flow model in accordance with an embodiment of the invention.

The relationship 500 between nodes and operating parameters in a BFM is discussed in accordance with an embodiment of the invention is shown in FIG. 5. A node 502 has a unique ancestor node 504. Node 502 and unique ancestor node 504 are connected by line 516. Both node 502 and unique ancestor node 508 have a series of operating parameters. In many embodiments of the invention, example operating parameters for node 502 include voltage 506 and power injection 510. Unique ancestor node 508 has corresponding voltage 508 and power injection 512. The line 512 also has operating parameters which for example include an impedance value as well as a current and/or power injection 514. The relationship between nodes and operating values will be discussed in greater detail below. Although many operating parameters between two nodes in a BFM are described above with respect to FIG. 5, any of a variety of operating parameters can be utilized as operating parameters as appropriate to the requirements of specific applications in accordance with embodiments of the invention.

Modelling a Power Distribution Network

A distribution network can be modeled by a directed tree graph $T:=(N,E)$ where $N:=\{0, \ldots, n\}$ represent the set of nodes (buses) and E represent the set of distribution lines connecting the nodes (buses) in N. Index the root of the tree by 0 and let $N_+:=N\setminus\{0\}$ denote the other nodes (buses). For each node i, it has a unique ancestor $A_i$ and a set of children nodes, denoted by $C_i$. The graph orientation is adopted where every line points toward the root. Each directed line connected a node i and its unique ancestor $A_i$. The lines are labeled by $E:=\{1, \ldots, n\}$ where each $i \in E$ denotes a line from i to $A_i$.

The root of the tree T can be an element of the power distribution network, typically a substation node (bus). It has a fixed voltage and redistributes the bulk power it receives from the transmission network to other nodes (buses). For each node (bus) $i \in N$, $V_i := |V_i| e^{i\theta_i}$ can be defined as its complex voltage and $v_i := |V_i|^2$ can be defined as its magnitude squared. In addition, $s_i := p_i + iq_i$ can be defined as its net complex power injection which is defined as generation minus load. For each line $i \in E$, let $z_i = r_i + ix_i$ be its complex impedance. In addition, $I_i$ can be defined as the complex branch current from node (bus) i to $A_i$ and $l_i := |I_i|^2$ can be defined as its magnitude squared. Furthermore, $S_i := P_i + iQ_i$ can be defined as the branch power flow from node (bus) i to $A_i$. The notations are illustrated in FIG. 5. A variable without a subscript denotes a column vector with appropriate components, as summarized below.

$$v := (v_i, i \in \mathcal{N}) \quad p := (p_i, i \in \mathcal{N}) \quad q := (q_i, i \in \mathcal{N})$$

$$l := (l_i, i \in \mathcal{E}) \quad P := (P_i, i \in \mathcal{E}) \quad Q := (Q_i, i \in \mathcal{E})$$

Solving for OPF

Figure 7:
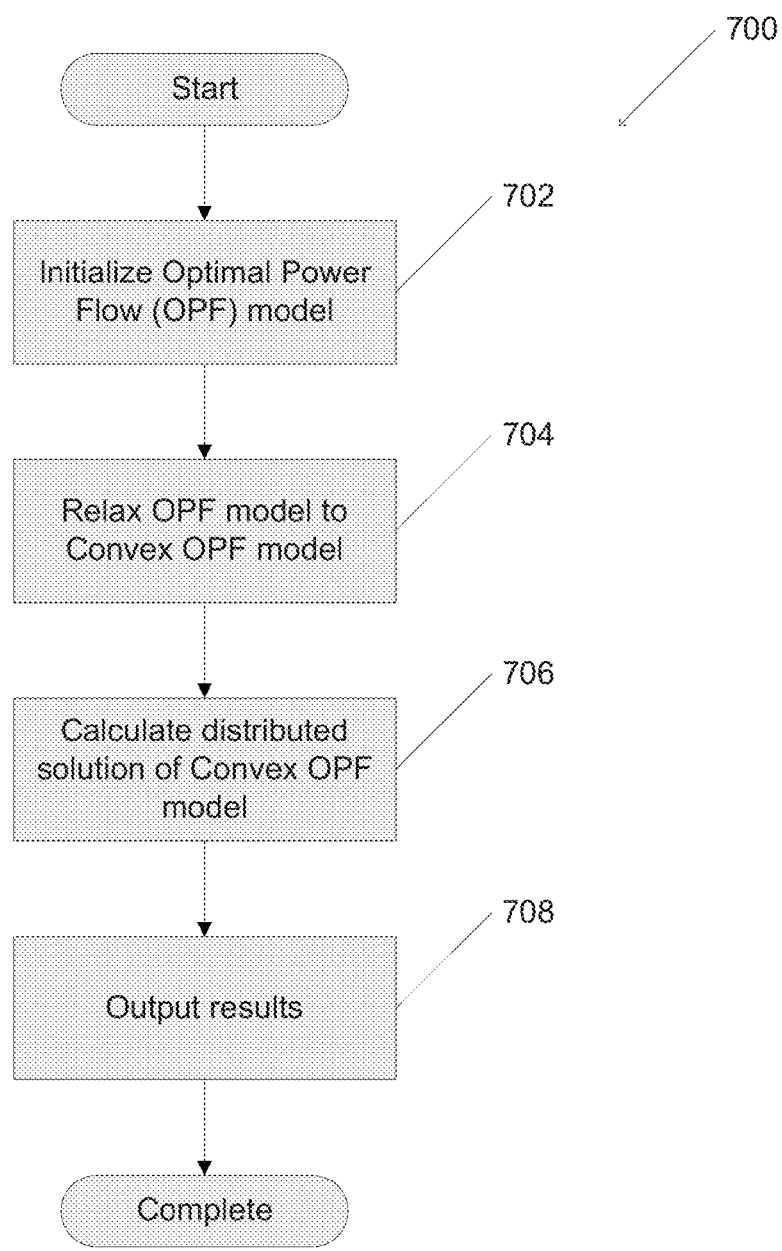
FIG. 7 is a flow chart illustrating a process to solve for optimal power flow utilizing a closed form solution in accordance with an embodiment of the invention.

An overview of a process 700 for solving for optimal power flow in a radial network utilizing a closed form solution is illustrated in FIG. 7. The OPF model is initialized 702. The nonconvex model is relaxed 704 generating a convex model. A distributed closed form solution is calculated 706 using the convex model. Finally, results are generated 708. A detailed discussion of the process follows.

As noted above, a branch flow model for radial networks is adopted. The process controls a single phase network, therefore, the phase angles of voltages and currents are ignored and the process uses only the variables $x := (v, l, P, Q, p, q)$. Compared with bus injection model, the branch flow model is more numerical stable and has broad application in distribution networks. Given the network T, the branch flow model is defined by:

$$v_{A_i} = v_i - 2(r_i P_i + x_i Q_i) + \ell_i(r_i^2 + x_i^2) \quad i \in \mathcal{E} \quad (1a)$$

$$\sum_{j \in C_i} (P_j - \ell_j r_j) + p_i = P_i \quad i \in \mathcal{N} \quad (1b)$$

$$\sum_{j \in C_i} (Q_j - \ell_j x_j) + q_i = Q_i \quad i \in \mathcal{N} \quad (1c)$$

$$P_i^2 + Q_i^2 = v_i \ell_i \quad i \in \mathcal{E} \quad (1d)$$

where $P_0, Q_0 = 0$ for ease of presentation. Given a vector x that satisfies (1), the phase angles of the voltages and currents can be uniquely determined if the network is a tree. Hence this (relaxed) model (1) is equivalent to a full AC power flow model.

The OPF problem seeks to optimize certain objectives, e.g. total power loss, subject to power flow equations (1) and various operational constraints. An objective function that can be utilized in accordance with many embodiments of the invention takes the following form:

$$F(x) = \sum_{i \in \mathcal{N}} f_i(p_i, \ell_i) \quad (2)$$

For instance, to minimize total power loss, set $f_0(p_0) = 0$ and $f_i(p_i, l_i) = l_i r_i$ for each $i \in N_+$.

In several embodiments, two operational constraints can be utilized. First, the power injection at each node (bus) $i \in N_+$ is constrained to be in a region $S_i$, i.e.

$$(p_i, q_i) \in S_i \quad (3a)$$

For controllable load, whose real power can vary within $[\underline{p}_i, \overline{p}_i]$ and reactive power can vary within $[\underline{q}_i, \overline{q}_i]$, the injection region $S_i = \{(p, q) \in \mathbb{R}^2 | p \in [\underline{p}_i, \overline{p}_i], q \in [\underline{q}_i, \overline{q}_i]\}$.

Second, the voltage magnitude at each load node (bus) $i \in N_+$ is constrained so that it is maintained within a prescribed region, i.e.

$$\underline{v}_i \leq v_i \leq \overline{v}_i \quad (3b)$$

Typically the voltage magnitude is allowed to deviate by 5% from its nominal value, i.e. $\underline{v}_i = 0.95^2$ and $\overline{v}_i = 1.05^2$.

The OPF problem is:

$$OPF: \min_x \sum_{i \in \mathcal{N}} f_i(p_i, \ell_i) \quad (4)$$

s.t. (1) and (3)

The OPF problem (4) is nonconvex due to the equality (1d). This is relaxed to inequality in $$P_i^2 + Q_i^2 \leq v_i l_i, i \in N_+ \quad (5)$$

resulting in a (convex) second-order cone program (SOCP):

$$ROPF: \min_x \sum_{i \in \mathcal{N}} f_i(p_i, \ell_i) \quad (6)$$

s.t. (1a)-(1c), (5) and (3)

Clearly, ROPF (6) provides a lower bound for the original OPF problem (4) since the original feasible set is enlarged. The relaxation can be called exact if every optimal solution of ROPF attains equality in (5) and hence is also optimal for the original OPF. For networks with a tree topology, SOCP relaxation is exact under some mild conditions.

The SOCP relaxation is assumed to be exact and this section develops a distributed algorithm that solves ROPF. First a standard alternating direction method of multiplier (ADMM) is reviewed. Then the structure of ROPF is used to speed up the standard ADMM algorithm by deriving closed form expressions for the optimization subproblems in each ADMM iteration.

Alternating Direction Method of Multipliers

ADMM blends the decomposability of dual decomposition with the superior convergence properties of the method of multipliers. It solves optimization problem of the form:

$$\min_{x,z} f(x) + g(z) \quad (7)$$

s.t. $x \in \mathcal{K}_x, z \in \mathcal{K}_z$ $Ax + Bz = c$ where $K_x$, $K_z$ are convex sets. In addition, $\lambda$ denotes the Lagrange multiplier for the constraint $Ax+Bz=c$.

Then the augmented Lagrangian is defined as $$L_\rho(x, z, \lambda) := f(x) + g(z) + \lambda^T(Ax + Bz - c) + \frac{\rho}{2}\|Ax + Bz - c\|^2,$$

where $\rho \geq 0$ is a constant. When $\rho=0$, the augmented Lagrangian reduces to the standard Lagrangian. ADMM consists of the iterations:

$$x^{k+1} \in \underset{x \in \mathcal{K}_x}{\arg\min}\, L_\rho(x, z^k, \lambda^k) \qquad (8a)$$

$$z^{k+1} \in \underset{z \in \mathcal{K}_z}{\arg\min}\, L_\rho(x^{k+1}, z, \lambda^k) \qquad (8b)$$

$$\lambda^{k+1} = \lambda^k + \rho(Ax^{k+1} + Bz^{k+1} - c) \qquad (8c)$$

Compared to dual decomposition, ADMM is guaranteed to converge to an optimal solution under less restrictive conditions. In a number of embodiments, the following conditions are utilized:

$$r^k := \|Ax^k + Bz^k - c\| \qquad (9a)$$

$$s^k := \rho\|A^T B(z^k - z^{k-1})\| \qquad (9b)$$

They can be viewed as the residuals for primal and dual feasibility. Under mild conditions, it can be shown that $$\lim_{k \to \infty} r^k = 0, \lim_{k \to \infty} s^k = 0$$

implying $$\lim_{k \to \infty} f(x^k) + g(z^k) = p^*$$

In applying ADMM to ROPF, the structure of ROPF is first exploited to derive subproblems that are decoupled and can be solved concurrently. Closed form solutions are then derived to these subproblems. Through decoupling of the solution, the subproblems can be solved by the network controllers to achieve distributed OPF. The standard idea of decoupling through local variables is explained in this subsection, which will be used in the next subsection.

In many embodiments:

$$\min_x\, f(x) \qquad (10a)$$

$$\text{s.t.}\quad a_i^T x = b_i,\, i \in \mathcal{J} \qquad (10b)$$

$$x \in \mathcal{K}_z \qquad (10c)$$

where $f(x)$ is a convex function and $K_z$ is a convex set. The variable x must satisfy the linear constraints (10b) for all $i \in J$ as well as be in $K_z$. As is shown below, making the constraints (10b) local so that the update (8) can be decomposed into several small optimization subproblems that can be solved simultaneously gives a speedup. To this end, local copies are created of x and they are computed in parallel. Each copy satisfies a different subset of the constraints before the algorithm converges. At optimality, all the local copies are required to be equal and hence satisfy all the constraints.

Partitioning of Radial Network to Decouple Nodes

Figure 6:
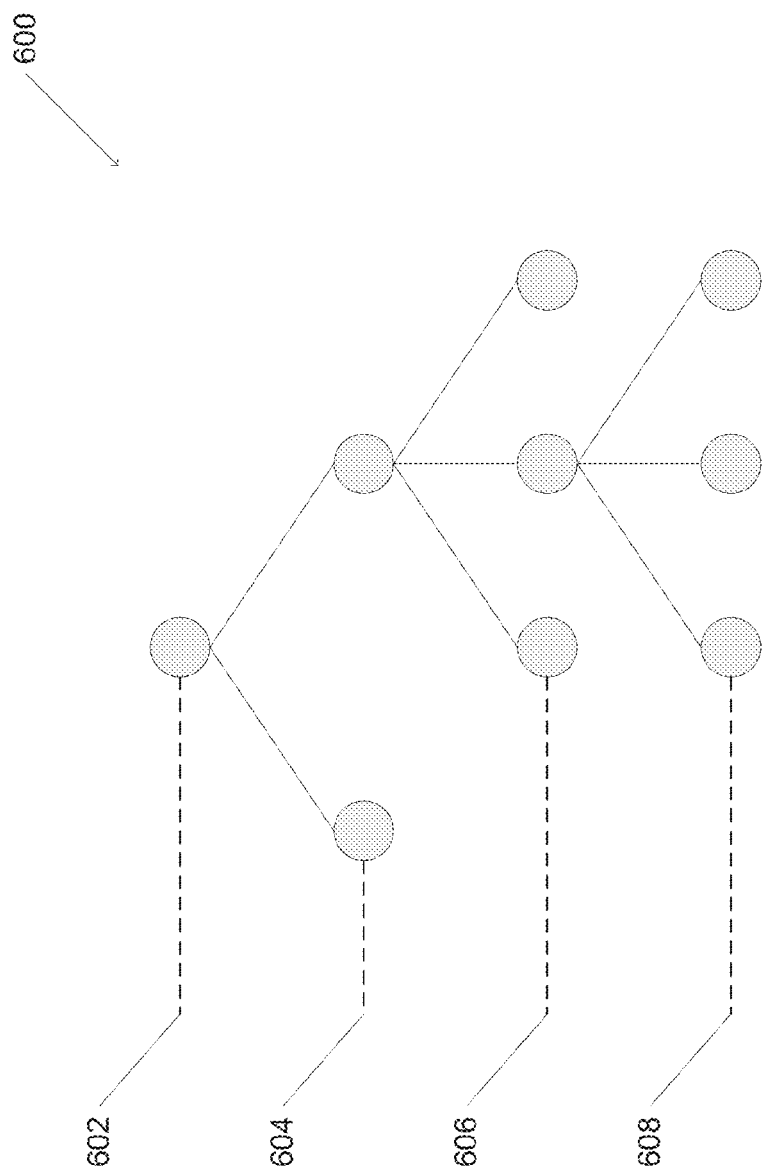
FIG. 6 is a diagram illustrating a partitioned radial network in accordance with an embodiment of the invention.

A partitioned radial network is shown in FIG. 6. In various embodiments, radial network 600 has a similar structure to radial network 400 as shown in FIG. 4. Additionally, radial network 600 can be partitioned into layers 602-608. In many embodiments layers are further partitioned into even and odd layers. Odd layers are layer 1 602 and layer 3 606. Even layers are layer 2 604 and layer 4 608. Although partitioning radial networks is described with reference to FIG. 6, any of a variety of partitioning schemes can be utilized as appropriate to the requirements of specific applications in accordance with embodiments of the invention. A detailed discussion of partitioning a radial network into layers is described in detail below.

Formally, let $\{J_l, 1 \leq l \leq m\}$ be a partition of J, i.e. $J_l$ are disjoint and $\cup_{1 \leq l \leq m} J_l = J$. There are m+1 constraints defined by the sets $K_z$ and $$K_x^l := \{x \in \mathbb{R}^n | a_i^T x = b_i, i \in J_l\}, 1 \leq l \leq m$$

In many embodiments, there are m+1 copies (z, ($x^{(l)}$, $1 \leq l \leq m$)) of the original variable. The decoupled version of (10) is:

$$\min_{x^{(l)}, z}\, f(z) \qquad (11)$$

$$\text{s.t.}\quad z \in \mathcal{K}_z$$

$$x^{(l)} \in \mathcal{K}_x^l,\, 1 \leq l \leq m$$

$$x^{(l)} - z = 0,\, 1 \leq l \leq m$$

The term $x := (x^{(l)}, 1 \leq l \leq m)$ can be used to denote the variable obtained by stacking all vectors $x^{(l)}$, $1 \leq l \leq m$. The last equality can be relaxed for each l. In addition, $\lambda^{(l)}$ can denote the corresponding Lagrange multipliers and $\lambda := (\lambda^{(l)}, 1 \leq l \leq m)$. Then the augmented Lagrangian is $$L_\rho(x, z, \lambda) := f(z) + \sum_{l=1}^{m}\left((\lambda^{(l)})^T(x^{(l)} - z) + \frac{\rho}{2}\|x^{(l)} - z\|^2\right)$$

The primal variables (x, z) and the multipliers $\lambda$ can be updated according to (8).

Next, it can be shown that two partitions (m=2) are sufficient for designing distributed OPF algorithm using this approach.

A distributed algorithm can be derived for solving ROPF (6) that has the following advantages First, each node (bus) only needs to solves a local subproblem in each iteration of (8). Moreover, there is a closed form solution for each subproblem, in contrast to most distributed processes for solving for OPF that employ iterative procedure to solve each subproblem. Second, communication is only required between adjacent nodes (buses).

Figure 8:
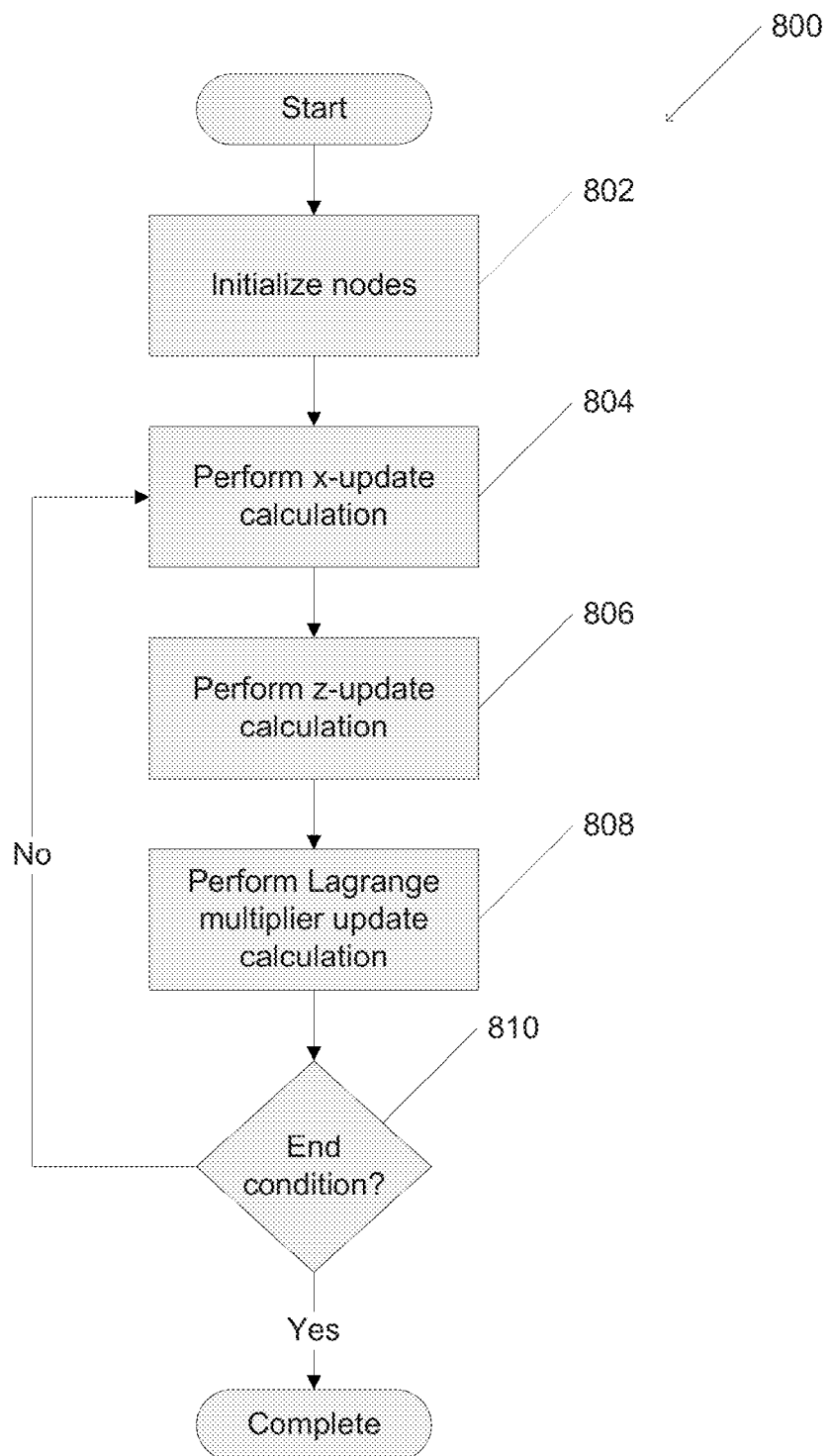
FIG. 8 is a flow chart illustrating a process to solve for optimal power flow using alternating direction method of multipliers in a closed form solution in accordance with an embodiment of the invention.

An overview of the ADMM process 800 to solve for OPF, where each distributed calculation involves evaluation of closed form solutions is illustrated in FIG. 8. Nodes are initialized 802 prior to performing 804 the x-update calculation. To perform the x-update calculation, a node will request required operating parameters from its ancestor and children nodes to enable performing this calculation. The remaining calculations do not require communication with neighboring nodes. The z-update calculation is performed 806, and then the Lagrange multiplier update is calculated 808. The end condition is checked 810. If the end condition has not been satisfied, the ADMM process begins performing the x-update calculation again. Otherwise, the process is complete. Although the process of ADMM is described with reference to FIG. 8, any of a variety of ADMM variants can be utilized as appropriate to the requirements of specific applications in accordance with embodiments of the invention. A detailed discussion of each of the update steps utilized in ADMM process similar to those described above with reference to FIG. 8 follows. Obtaining closed form expressions for each of the update steps utilized in the distributed processes involves rewritting the relaxed OPF problem in a manner that lends itself to solving as a series of subproblems.

The ROPF problem (6) is written in the form of (10) as:

$$\min_x \sum_{i \in N} f_i(p_i, \ell_i)$$

s.t. $x$ satisfies (1a)-(1c)

$x \in \mathcal{K}_z$ where $\mathcal{K}_z := \{z | z \text{ satisfies (3) and (5)}\}$. Next, the constraints in (1a)-(1c) can be partitioned to be equivalently in the form of (11) such that the update in (8) can be done simultaneously by each node (bus).

Each node (bus) $i \in N$ can be treated as an agent with its local variables $x_i := (v_i, l_i, P_i, Q_i, p_i, q_i)$. Then the constraints in $\mathcal{K}_z$ are local, i.e. they are separable for each agent i. Note that the network T is a tree, which is a bipartite graph and can be partitioned into two groups $J_1 := \{i \in N | i \text{ is in the odd layer}\}$ and $J_2 := \{i \in N | i \text{ is in the even layer}\}$. Let $$K_x^l = \{x_i^{(l)} \text{ satisfies (1a)-(1c) for } i \in J_l\}, l=1,2$$

Under such partition, node (bus) $i \in J_1$ ($J_2$) is only coupled with nodes (buses) $k \in J_2$ ($J_1$). In particular, by (1a), each node (bus) i needs the voltage $v_{A_i}$ from its ancestor $A_i$. Thus creating a copy $v_{A_i,i}$, representing the replication of $v_{A_i}$ at node (bus) i. On the other hand, in (1b) and (1c), each node (bus) i needs $l_j$, $P_j$, $Q_j$ from all of its children $j \in C_i$ and creating a copy $l_{j,i}, P_{j,i}, Q_{j,i}$ of each $j \in C_i$ at node (bus) i. Then the ROPF problem (6) can be written in the form of (11).

E-ROPF:

$$\min_{x,z} \sum_{i \in N} f_i(p_i^{(2)}, \ell_i^{(2)}) \quad (12a)$$

s.t. $v_{A_i,i}^{(l)} = v_i^{(l)} - 2(r_i P_i^{(l)} + x_i Q_i^{(l)}) + \ell_i^{(l)}(r_i^2 + x_i^2)$ $i \in \mathcal{E} \, l \in \{1, 2\}$ $$\sum_{j \in C_i} (P_{j,i}^{(l)} - \ell_{j,i}^{(l)} r_j) + p_i^{(l)} = P_i^{(l)} \quad i \in \mathcal{N} \, l \in \{1, 2\} \quad (12b)$$

$$\sum_{j \in C_i} (Q_{j,i}^{(l)} - \ell_{j,i}^{(l)} x_j) + q_i^{(l)} = Q_i^{(l)} \quad i \in \mathcal{N} \, l \in \{1, 2\} \quad (12c)$$

$(P_i^{(2)})^2 + (Q_i^{(2)})^2 \le v_i^{(2)} \ell_i^{(2)} \, i \in \mathcal{E} \quad (12d)$ $(p_i^{(2)}, q_i^{(2)}) \in S_i \, i \in \mathcal{N} \quad (12e)$ $\underline{v}_i \le v_i^{(2)} \le \overline{v}_i \, i \in \mathcal{N} \quad (12f)$ $x^{(l)} - z = 0 \, l \in \{1, 2\} \quad (12g)$ where (12a)-(12c) form $(K_x^{(l)}, l=1,2)$ and (12d)-(12f) form $\mathcal{K}_z$. The value of the superscript l depends on the partition that i belongs to, i.e. $l=1$ (2) if $i \in J_1$ ($J_2$). Let $\lambda$, $\gamma$ and $\mu$ be Lagrangian multipliers associated with $x^{(l)} - z = 0$, specifically $\lambda_{1,i}: \quad v_i^{(l)} - v_i^{(z)} = 0 \qquad \lambda_{2,i}: \quad \ell_i^{(l)} - \ell_i^{(z)} = 0$ $\lambda_{3,i}: \quad P_i^{(l)} - P_i^{(z)} = 0 \qquad \lambda_{4,i}: \quad Q_i^{(l)} - Q_i^{(z)} = 0$ $\lambda_{5,i}: \quad p_i^{(l)} - p_i^{(z)} = 0 \qquad \lambda_{6,i}: \quad q_i^{(l)} - q_i^{(z)} = 0$ $\mu_{1,i}: \quad \ell_{i,A_i}^{(l)} - \ell_i^{(z)} = 0 \qquad \mu_{2,i}: \quad P_{i,A_i}^{(l)} - P_i^{(z)} = 0$ $\mu_{3,i}: \quad Q_{i,A_i}^{(l)} - Q_i^{(z)} = 0$ $\gamma_j: \quad v_{i,j}^{(l)} - v_i^{(z)} = 0 \text{ for } j \in C_i$ Denote $x_i^{(l)} := (v_i^{(l)}, l_i^{(l)}, P_i^{(l)}, Q_i^{(l)}, p_i^{(l)}, q_i^{(l)})$ $z_i := (v_i^{(z)}, l_i^{(z)}, P_i^{(z)}, Q_i^{(z)}, p_i^{(z)}, q_i^{(z)})$ $x_{i,A_i}^{(l)} := (l_{i,A_i}^{(l)}, P_{i,A_i}^{(l)}, Q_{i,A_i}^{(l)})$ $\lambda_i := (\lambda_{k,i} | k=1,2,3,4,5,6)$ $\mu_i := (\mu_{k,i} | k=1,2,3)$ Then the variables maintained by each node (bus) i are:

$A_i := \{x_i^{(l)}, x_{i,A_i}^{(l)}, \{v_{i,j}^{(l)}, \gamma_j | j \in C_i\}, z_i, \lambda_i, \mu_i\}.$ The E-ROPF problem (12) can be solved in a distributed manner, i.e. both the x-update (8a) and z-update (8b) can be decomposed into small subproblems that can be solved simultaneously. For ease of presentation, the iteration number k is removed in (8) for all the variables, which will be updated accordingly after each subproblem is solved. The augmented Lagrangian for modified ROPF problem is given in (13).

$$L_\rho(x, z, \lambda, \gamma, \mu) \quad (13a)$$

$$= \sum_{i \in N} \left( f_i(p_i^{(2)}) + \lambda_i^T(x_i^{(l)} - z_i) + \mu_i^T(x_{i,A_i}^{(l)} - z_i) + \sum_{j \in C_i} \gamma_j(v_{i,j}^{(l)} - v_i^{(2)}) + \frac{\rho}{2} \left( \|x_i^{(l)} - z_i\|^2 + \|x_{i,A_i}^{(l)} - z_i\|^2 + \sum_{j \in C_i} (v_{i,j}^{(l)} - v_i^{(2)})^2 \right) \right) \quad (13b)$$

$$= \sum_{i \in N} \left( f_i(p_i^{(2)}) + \lambda_i^T(x_i^{(l)} - z_i) + \sum_{j \in C_i} \mu_j^T(x_{j,i}^{(l)} - z_j) + \gamma_i(v_{A_i,i}^{(l)} - v_{A_i}^{(2)}) + \frac{\rho}{2} \left( \|x_i^{(l)} - z_i\|^2 + \sum_{j \in C_i} \|x_{j,i}^{(l)} - z_j\|^2 + (v_{A_i,i}^{(l)} - v_{A_i}^{(2)})^2 \right) \right) \quad (13c)$$

Notations are abused in (13) and denoted $x_{i,A_i}^{(l)} - z_i := (l_{i,A_i}^{(l)} - l_i^{(z)}, P_{i,A_i}^{(l)} - P_i^{(z)}, Q_{i,A_i}^{(l)} - Q_i^{(z)})$ although there are 3 entries in $x_{i,A_i}^{(l)}$ but 6 entries in $z_i$. By (13c), in the x-update step (8a), solve $$\arg\min_{x \in \mathcal{K}_x} L_\rho(x, z, \lambda, \gamma, \mu) = \arg\min_{x \in \mathcal{K}_x} \sum_{i \in N} G_i(x^{(l)}),$$

where $$G_i(x^{(l)}) := \lambda_i^T x_i^{(l)} + \sum_{j \in C_i} \mu_j^T x_{j,i}^{(l)} + \gamma_i v_{A_i,i}^{(l)} +$$

-continued
$$\frac{\rho}{2}\left(\|x_i^{(t)} - z_i\|^2 + \sum_{j \in C_i} \|x_{j,i}^{(t)} - z_j\|^2 + \left(v_{A_i,i}^{(t)} - v_{A_i}^{(2)}\right)^2\right)$$

For each node i, the corresponding subproblem is $$\min G_i(x^{(t)}) \quad (14)$$
$$\text{s.t.} \quad v_{A_i,i}^{(t)} = v_i^{(t)} - 2(r_i P_i^{(t)} + x_i Q_i^{(t)}) + \ell_i^{(t)}(r_i^2 + x_i^2)$$
$$\sum_{j \in C_i} (P_{j,i}^{(t)} - \ell_{j,i}^{(t)} r_j) + p_i^{(t)} = P_i^{(t)}$$
$$\sum_{j \in C_i} (Q_{j,i}^{(t)} - \ell_{j,i}^{(t)} x_j) + q_i^{(t)} = Q_i^{(t)}$$

which takes the following form $$\min_x \frac{\rho}{2} \|x\|_2^2 + c^T x \quad \text{s.t.} \quad Bx = 0$$

whose closed form solution is given as $$x = \frac{1}{\rho}\left(B^T(BB^T)^{-1}Bc - \frac{1}{\rho}c\right)$$

Prior to performing the x update, each node i requests variables from its ancestor $A_i$ and children $j \in C_i$. In particular, the node can obtain $v_{A_i}^{(t)}$, $V_{A_i}^{(z)}$ and $\gamma_i$ from its ancestor $A_i$ and $x_{j,i}^{(t)}$, $z_j$, $\mu_j$ from all of its children $j \in C_i$. After the x update, the node can send the updated variables back to its ancestor $A_i$ and its children $j \in C_i$. As will be shown, only the x update requires communication with neighbors.

Based on (13b), in the z-update step, solve $$\operatorname*{argmin}_{z \in \mathcal{K}_z} L_\rho(x, z, \lambda, \gamma, \mu) = \operatorname*{argmin}_{z \in \mathcal{K}_z} \sum_{i \in N} H_i(z),$$

where $$H_i(z) := f(p_i^{(z)}, \ell_i^{(z)}) - \lambda_i^T z_i - \mu_i^T z_i - \sum_{j \in C_i} \gamma_j v_i^{(z)} +$$
$$\frac{\rho}{2}\left(\|x_i^{(t)} - z_i\|^2 + \|x_{i,A_i}^{(t)} - z_i\|^2 + \sum_{j \in C_i} \left(v_{i,j}^{(t)} - v_i^{(2)}\right)^2\right)$$

The subproblem solved by each node i is $$\min H_i(z)$$
$$\text{s.t.} (P_i^{(z)})^2 + (Q_i^{(z)})^2 \leq v_i^{(z)} \ell_i^{(z)}$$
$$\underline{v}_i \leq v_i^{(z)} \leq \overline{v}_i$$
$$(p_i^{(z)}, q_i^{(z)}) \in S_i$$

Suppose $f_i(p_i^{(z)}, l_i^{(z)})$ is linear or quadratic in its argument. Let $\kappa = (|C_i|+1)^{-1/2}$ and scale $v_i^{(z)}$ down by $\kappa$ in the above problem. Then it takes the following form:

$$\min_y \sum_{i=1}^{6} (y_i^2 + c_i y_i) \quad (16)$$

s.t. $y_1^2 + y_2^2 \leq \kappa^2 y_3 y_4$ $\underline{y}_3 \leq y_3 \leq \overline{y}_3$ $(y_5, y_6) \in S_i$ Note that $(y_1, \ldots, y_4)$ and $(y_5, y_6)$ are independent in the optimization problem (16). Thus two independent subproblems exist. The first subproblem solves $$\min_{y_5, y_6} \sum_{i=5}^{6} (y_i^2 + c_i y_i) \quad \text{s.t.} \quad (y_5, y_6) \in S_i$$

which determines the update of $(y_5, y_6)$. The solution is $$(y_5, y_6) = \left(\left[\frac{-c_5}{2}\right]_{\underline{p}_i}^{\overline{p}_i}, \left[\frac{-c_6}{2}\right]_{\underline{q}_i}^{\overline{q}_i}\right),$$

where $[x]_a^b := \min\{b, \max\{x, a\}\}$. The second subproblem solves $$\min_{y_1, y_2, y_3, y_4} \sum_{i=1}^{4} (y_i^2 + c_i y_i)$$

s.t. $y_1^2 + y_2^2 \leq k^2 y_3 y_4$ $\underline{y}_3 \leq y_3 \leq \overline{y}_3$ which determines the update of $(y_1, \ldots, y_4)$. After the z-update, the Lagrange multipliers are updated for the relaxed constraints as (8c). Both the z-update and multiplier update steps only involve local variables of an agent and no communication is required. Finally, the stopping criteria for the algorithm is specified. Empirical results show that the the solution is accurate enough when both the primal residual $r^k$ defined in (9a) and the dual residual $s^k$ defined in (9b) are below $10^{-4}\sqrt{N}$, where N is the number of nodes (buses). A derivation of the closed form expression follows.

Derivation of Closed Form Expression

As shown above, to determine the update of $(y_1, \ldots, y_4)$ the following expression can be utilized:

$$P1: \min_y \sum_{i=1}^{4} (y_i^2 + c_i y_i)$$

s.t. $y_1^2 + y_2^2 \leq k^2 y_3 y_4$ $y_3 \in [\underline{y}_3, \overline{y}_3]$ where $\underline{y}_3 > 0$. If R can be defined as $R := \sqrt{y_1^2 + y_2^2}$, then P1 can be written equivalently as $$P2: \min \sum_{i=3}^{4} (y_i^2 + c_i y_i) + f(R)$$

s.t. $R^2 \leq k^2 y_3 y_4$ $y_3 \in [\underline{y}_3, \overline{y}_3]$ where $$f(R) = \min_{y_1,y_2}\left\{\sum_{i=1}^{2}(y_i^2 + c_iy_i) \text{ s.t. } y_1^2 + y_2^2 = R^2\right\}$$
$$= R^2 - R\sqrt{c_1^2 + c_2^2}$$

P2 can be solved utilizing the removing the constraint $R^2 \leq k^2 y_3 y_4$ from P2 so it can become:

$$\min \sum_{i=3}^{4}(y_i^2 + c_iy_i) + f(R)$$
$$\text{s.t. } y_3 \in [\underline{y_3}, \overline{y_3}]$$

In various embodiments, an optimal solution can be given by $$\hat{y}_3 = -\frac{c_3}{2}, \hat{y}_4 = -\frac{c_4}{2}, \hat{R} = \frac{\sqrt{c_1^2 + c_2^2}}{2}$$

It can be proven [in Lemma 0.1 to follow] that $\hat{R}^2 \leq k^2\hat{y}_3\hat{y}_4$, $(\hat{y}_3,\hat{y}_4,\hat{R})$ is also optimal for P2 when $R^2 - y_3y_4$ is not convex but $g(y) = R^2/y_3 - k^2 y_4$ is convex.

Lemma 0.1. K can be a convex set and $f(y), g(y): \mathbb{R}^n \to \mathbb{R}$ be convex differentiable functions.

Denote $y^* := \mathrm{argmin}_{y \in K}\{f(y)|g(y) \leq 0\}$ and $\hat{y} := \mathrm{argmin}_{y \in K} f(y)$. Then $g(\hat{y}) > 0 \Rightarrow g(y^*) = 0$ Proof. The Lagrangian of $\min_{y \in K}\{f(y) \text{ s.t. } g(y) \leq 0\}$ can be written as $L(y, \lambda) = f(y) + \lambda g(y)$ where $\lambda \geq 0$ is the Lagrangian multiplier of $g(y) \leq 0$. In many embodiments, $g(y^*)$ can be $g(y^*) < 0$, then the KKT conditions indicate that the optimal primal $y^*$ and dual $\lambda^*$ satisfy $y^* = \mathrm{argmin}_{y \in K}\{f(y) + \lambda^* g(y)\}$ $g(y^*) < 0 \Rightarrow \lambda^* = 0$ This can mean $y^* = \mathrm{argmin}_{y \in K} f(y) = \hat{y}$, which contradicts $g(\hat{y}) > 0$.

Otherwise, the optimal solution to P2 satisfies $R^2 = k^2 y_3 y_4$ and the derivation can proceed as follows.

$R = k\sqrt{y_3 y_4}$ can be substituted into f(R) and P2 becomes

P3: $\min g(y_3, y_4) \text{ s.t. } y_3 \in [\underline{y_3}, \overline{y_3}]$ where $g(y_3, y_4) =$ $$\sum_{i=3}^{4}(y_i^2 + c_iy_i) + k^2 y_3 y_4 - k\sqrt{c_1^2 + c_2^2}\sqrt{y_3 y_4} \quad (17)$$

$S_g$ can be set of local minima of $g(y_3, y_4)$ is denoted by $$S_g := \left\{(y_3, y_4) \,\middle|\, \frac{\partial g}{\partial y_3} = 0, \frac{\partial g}{\partial y_4} = 0\right\}.$$

Additionally, $S_g^*$ can be a set of feasible local minima to P3 and $h(y_3) := \mathrm{argmin}_{y_4} g(y_3, y_4)$ and is denoted by $S_g^* := S_g \cap \{(y_3, y_4) | y_3 \in [\underline{y_3}, \overline{y_3}]\}$. Then, in some other embodiments, the optimal solution to P3 lies in $S_g^* \cup \{\underline{y_3}, h(\underline{y_3})), (\overline{y_3}, h(\overline{y_3}))\}$ It can also be proven that by obtaining all the elements in $S_g$, $S_g$ is equivalent to solving a polynomial equation with degree of 4 [in (Lemma 0.2) to follow,]. In addition, it can be proven that solving $h(y_3)$ is equivalent to solving a polynomial equation with degree of 3 [in (Lemma 0.3) to follow]. This implies there can be a closed form expression to P2 and P1.

Lemma 0.2. $g(y_3, y_4)$ can be defined in (17). Then the set of local minima of $g(y_3, y_4)$: $S_g$ can be written as $\{(y_3, y_4) | (y_3, y_4, z_2, z_1) \text{ satisfies (18) and } z_1 \text{ satisfies (19)}\}$ $$y_3 = \frac{1}{4 - k^4}(2(z_1 - c_3) - k^2(z_2 - c_4)) \quad (18a)$$

$$y_4 = \frac{1}{4 - k^4}(2(z_2 - c_4) - k^2(z_1 - c_3)) \quad (18b)$$

$$z_1 z_2 = k^2 \frac{c_1^2 + c_2^2}{4} \quad (18c)$$

$$z_1^4 + \left(-c_3 + \frac{k^2 c_4}{2}\right)z_1^3 - \left(-c_4 + \frac{k^2 c_3}{2}\right)\left(k^2 \frac{c_1^2 + c_2^2}{4}\right)z_1 - \left(k^2 \frac{c_1^2 + c_2^2}{4}\right)^2 = 0 \quad (19)$$

which means (18) can be used to solve (19) and recover $(z_3, z_4)$.

Proof. A derivative of $g(y_3, y_4)$ can be taken with respect to $y_3, y_4$ to give $$\frac{\partial g}{\partial y_3} = 2y_3 + c_3 + k^2 y_4 - k\frac{\sqrt{c_1^2 + c_2^2}}{2}\sqrt{\frac{y_4}{y_3}} = 0$$

$$\frac{\partial g}{\partial y_4} = 2y_4 + c_4 + k^2 y_3 - k\frac{\sqrt{c_1^2 + c_2^2}}{2}\sqrt{\frac{y_3}{y_4}} = 0$$

which can be equivalent to $$2y_3^2 + c_3 y_3 = 2y_4^2 + c_4 y_4 \quad (20)$$

$$(2y_3 + k^2 y_4 + c_3)(2y_4 + k^2 y_3 + c_4) = k^2 \frac{c_1^2 + c_2^2}{4} \quad (21)$$

(18a) and (18b) can be substituted into (20) and (21), to generate $$z_1^2 + \left(-c_3 + \frac{k^2 c_4}{2}\right)y_1 = z_2^2 + \left(-c_4 + \frac{k^2 c_3}{2}\right)z_2 \quad (22)$$

$$z_1 z_2 = k^2 \frac{c_1^2 + c_2^2}{4} \quad (23)$$

In addition, (23) can be substituted into (22), to generate (19).

Lemma 0.3. $h(y_3)$ can be defined as $h(y_3):=\text{argmin}_{y_4} g(y_3,y_4)$. Then $h(y_3) = \min\{g(y_3, y_4) | y_4 \text{ satisfies (24)}\}.$ $$2(\sqrt{y_4})^3 + c_4 \sqrt{y_4} + \left(k^2 y_3 - \frac{\sqrt{y_3(c_1^2 + c_2^2)}}{2}\right) = 0. \quad (24)$$

Proof. Let $$S_h(y_3) := \left\{ y_4 \,\Big|\, \frac{\partial g}{\partial y_4} = 0 \right\},$$

which is the set of all local minima of $g(y_3, y_4)$ with fixed $y_3$. Taking the derivative of $g(y_3, y_4)$ with respect to $y_4$ gives $$\frac{\partial g}{\partial y_4} = 2y_4 + c_4 + k^2 y_3 - k\frac{\sqrt{c_1^2 + c_2^2}}{2}\sqrt{\frac{y_3}{y_4}} = 0,$$

which is equivalent to (24). Solving (24) is equivalent to solving a polynomial equation with degree of 3.

Communication Between Node Controllers

Figure 9:
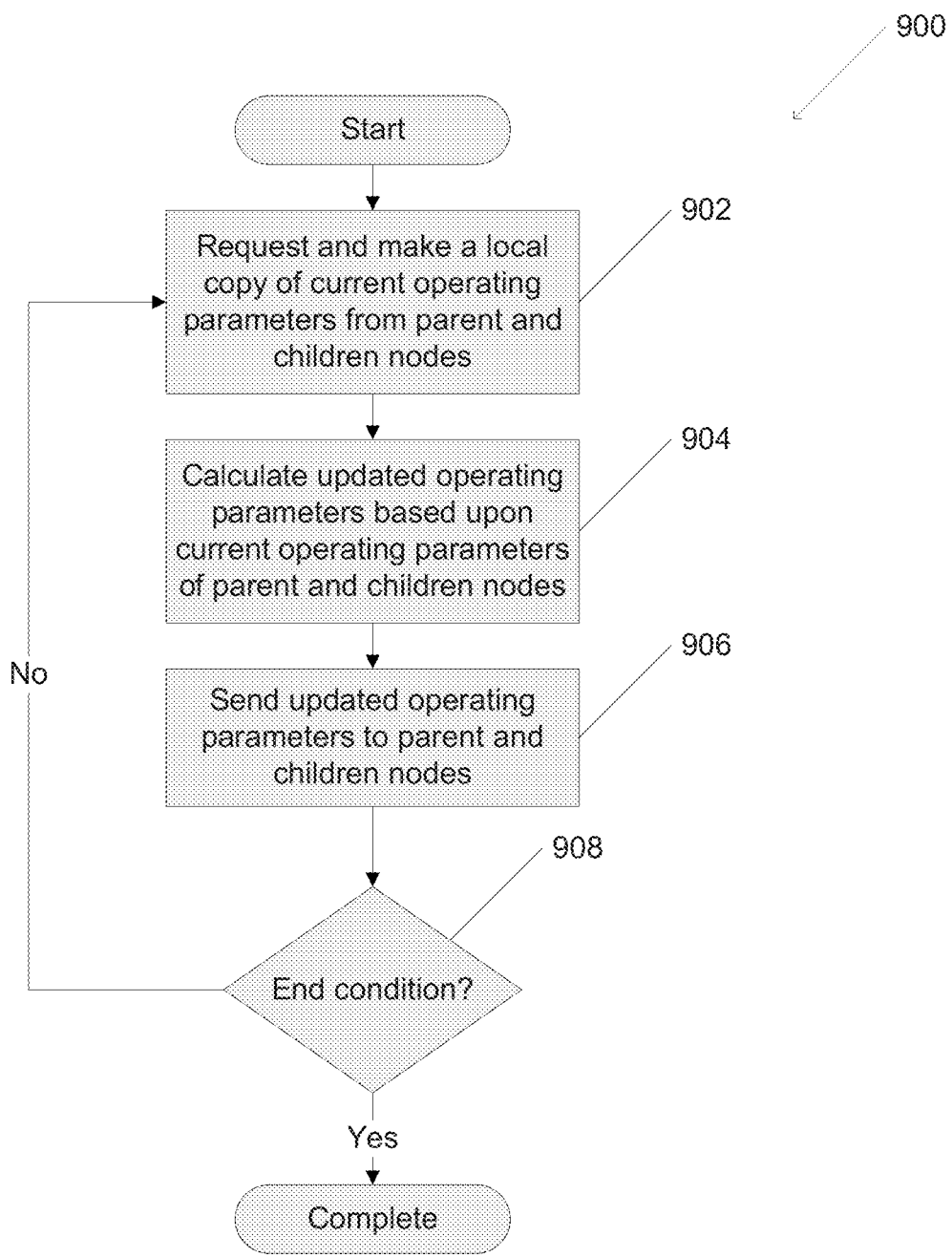
FIG. 9 is a flow chart illustrating a process for a node to perform a distributed power control application in accordance with an embodiment of the invention.
Figure 10A:
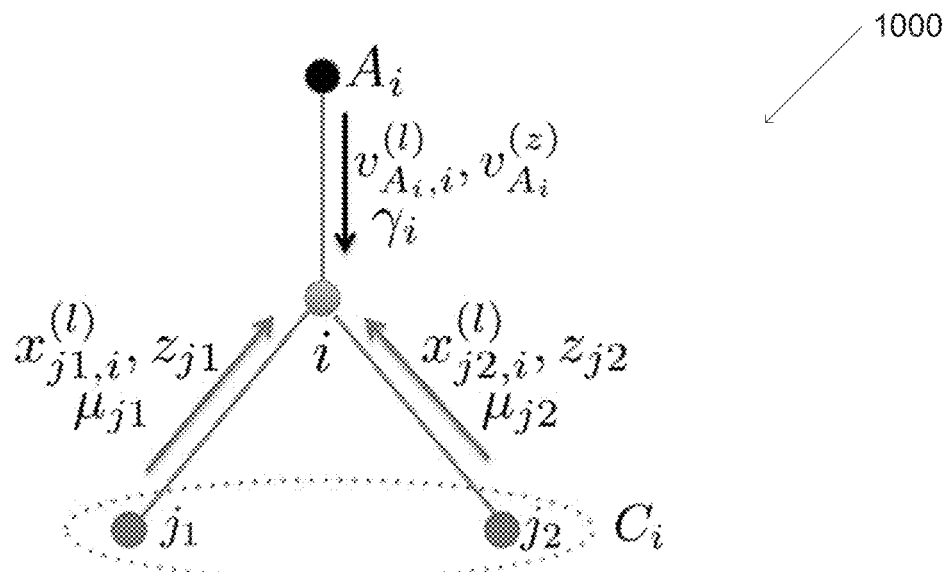
FIGS. 10A-10B are diagrams illustrating a set of nodes before and after an x-update step, respectively, in accordance with an embodiment of the invention.
Figure 10B:
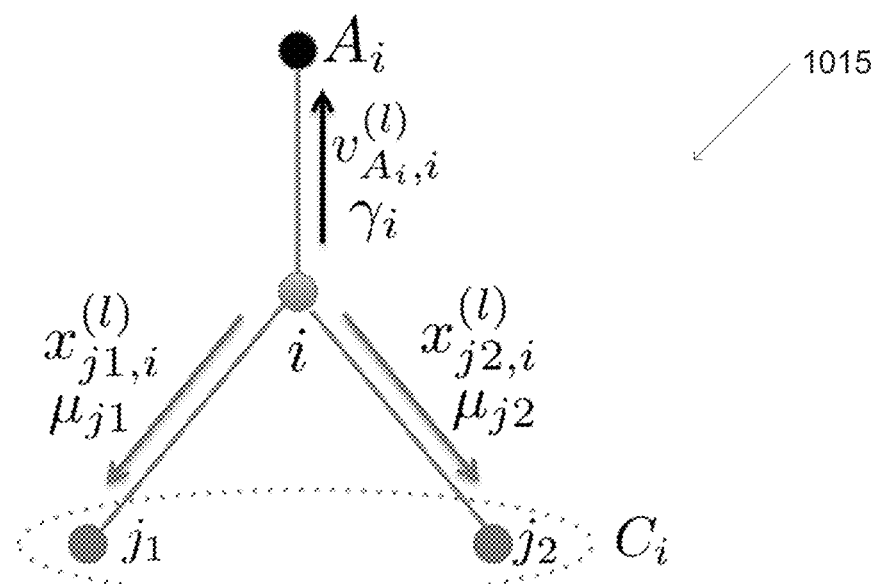

Referring back to FIG. 8, the process performed by node controllers in accordance with many embodiments of the invention involves performing the x-update calculation 804, the z-update calculation 806, and the Lagrange multiplier update 808 until an end condition is reached 810. As noted above, the calculations performed in each of the x-update, z-update, and Lagrange multiplier update calculations involve the evaluation of closed form expressions. The information exchange that occurs during the update calculations is illustrated in FIGS. 9, 10A and 10B. In process 900 shown in FIG. 9, a node requests and makes local copies 902 of current operating parameters from its ancestor and children nodes. Updated operating parameters are calculated 904 based upon current operating parameters of ancestor and children nodes. After this calculation is performed, the updated operating parameters are sent 906 to ancestor and children nodes. The end condition is checked 908 and if it has not been met the process begins again by requesting and making local 902 copies of current operating parameters from ancestor and children nodes. Otherwise the process is complete and it ends. The specific operating parameters passed between nodes and their ancestors and/or children nodes before 1000 and after 1015 the x-update process is illustrated in FIGS. 10A and 10B. As can readily be appreciated, additional communication and/or information can occur between nodes during the execution of the distributed processes by the node controllers.

The above discussion provides a detailed discussion of the manner in which closed form solutions can be developed for subproblems that can be solved by individual node controllers to achieve a distributed solution to achieve OPF in a radial power distribution network. The manner in which the solutions outlined in the above discussion can be utilized to implement processes that are executed in node controllers in accordance with various embodiments of the invention is discussed further below.

Implementing Distributed Power Control Processes

A variety of techniques can be utilized to implement processes for execution by node controllers to achieve distributed OPF based upon closed form expressions developed using techniques similar to those outlined above. Pseudocode 1100 that can be utilized to implement processes executed by node controllers to achieve distributed power control in accordance with various embodiments of the invention is illustrated in FIG. 11. The psuedocode primarily follows a process similar to those outlined above with respect to FIG. 8. The psuedocode takes as inputs the network topolgy. In many embodiments, the network topology is predetermined and distributed to each node controller. In several embodiments, the network topology is discovered by the node controllers using any of a variety of well known network discovery protocols. Additional inputs include power injection region, voltage region, and line impedance. The psuedocode initialize the variables and then proceeds to perform the x-update, z-update, and Lagrangian multiplier update in a manner similar to the processes described above until a stopping condition is reached. At which point, the process outputs new voltage and power injection parameters for use by the node controller in the localized control of the power distribution network. As discussed above, execution of the psuedocode by node controllers distributed throughout a power distribution network can achieve OPF. Specific simulations of the OPF performance achieved using distributed power control in accordance with various embodiments of the invention is discussed further below.

Case Study Using a Distributed ADMM Power Control Process

To demonstrate the scalability of the distributed processes described herein, the performance of the distributed processes was simulated on a model of a 2,065-bus distribution circuit in the service territory of Southern California Edison. The simulation involved 1,409 household loads, whose power consumptions are within 0.07 kw-7.6 kw and 142 commercial loads, whose power consumptions are within 5 kw-36.5 kw. The simulation also included 135 rooftop PV panels, whose nameplates are within 0.7-4.5 kw, distributed across the 1,409 houses.

The network is unbalanced three phase. It is assumed that the three phases are balanced and considered a single phase network. The voltage magnitude at each load bus is allowed within [0.95, 1.05] per unit (pu), i.e. $\overline{v}_i = 1.05^2$ and $\underline{v}_i = 0.95^2$ for $i \in N_+$. The control devices are the rooftop PV panels whose reactive power injections are controlled. The objective is to minimize power loss across the network, namely $f_i(p_i, l_i) = 1_i r_i$ for $i \in N_+$ in (2). Each bus is a node and there are 2,065 nodes in the network that include node controllers configured to solve the OPF problem in a distributed manner using the various techniques described above.

The simulation was implemented in Matlab 2013a and run on Macbook pro 2013 with i5 dual core processor. The following aspects are the main focus of the simulation. Solution feasibility: the primal residual $r^k$ defined in (9a) measures the feasibility of the solution for ADMM. In the simulation, (12g) is relaxed and $r^k = \sqrt{\|(x^{(1)})^k - z^k\|^2 + \|(x^{(2)})^k - z^k\|^2}$ with respect to the iterations k. Optimality: the dual feasibility error $s^k$ defined in (9b) measures the optimality of the solution for ADMM. Using a distributed process similar to the processes described above, the dual residual $s^k = \rho\|z^k - z^{k-1}\|$ with respect to the iterations k. Computation time: the proposed distributed algorithm is run on a single machine. The total time can be divided by the number of agents to roughly estimate the time required for each agent to execute its own distributed process (excluding communication overhead).

Figure 12B:
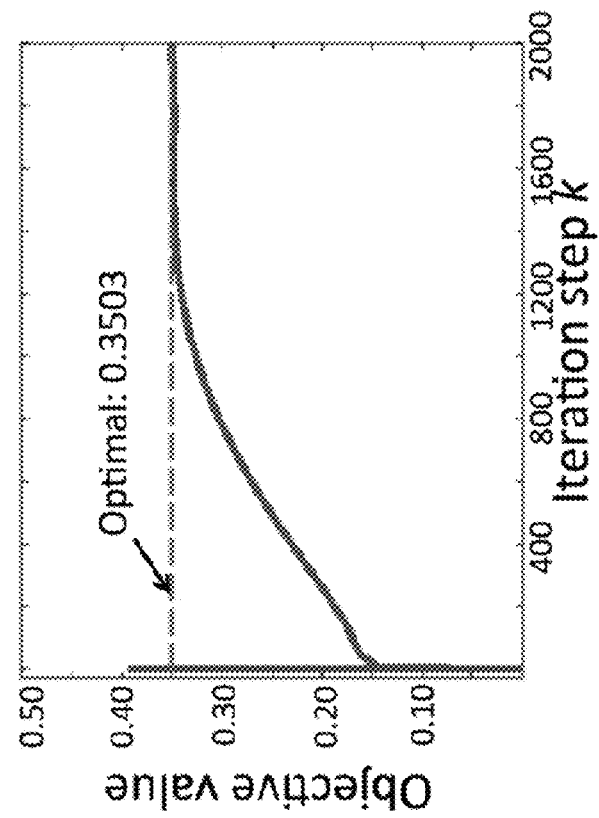
FIG. 12B is a diagram illustrating an objective value over k iterations during a simulated distributed process in accordance with an embodiment of the invention.
Figure 12A:
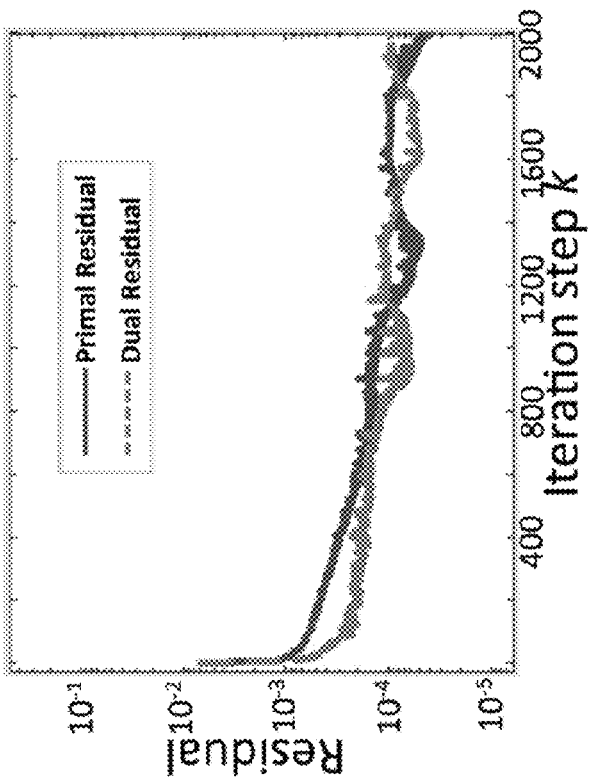
FIG. 12A is a diagram illustrating a primal and dual residue over k iterations during a simulated distributed process in accordance with an embodiment of the invention.

During the simulation, the stopping criteria was that both the primal and dual residual be below $10^{-4}\sqrt{N}$ and FIG. 12A illustrates the evolution of $r^k/\sqrt{N}$ and $s^k/\sqrt{N}$ over iterations k. The stopping criteria are satisfied after 1,114 iterations. The evolution of the objective value is illustrated in FIG. 12B. It takes 1,153 s to run 1,114 iterations on a single computer. Then the average time spent by each agent is roughly 0.56 s (excluding communication overhead) when distributed processes are utilized.

Moreover, the advantage of deriving closed form expression is shown by comparing the computation time of solving the subproblems between an off-the-shelf solver (CVX) and distributed processes implemented in accordance with an embodiment of present invention. In particular, the average computation time of solving the subproblem in both the x and z update is computed. In the x update, the average time required to solve the subproblem is $1.7\times10^{-4}$ s for the simulated distributed process but 0.2 s for CVX. In the z update, the average time required to solve the subproblem is $5.1\times10^{-4}$ s for the simulated distributed process but 0.3 s for CVX. Thus, each ADMM iteration takes about $6.8\times10^{-4}$ s but 0.5 s for using a conventional solver.

Although the present invention has been described in certain specific aspects, many additional modifications and variations would be apparent to those skilled in the art. It is therefore to be understood that the present invention can be practiced otherwise than specifically described without departing from the scope and spirit of the present invention including (but not limited to) performing the distributed processes herewith respect to a sub-network only in a hybrid implementation of an OPF process in which some nodes are centrally controlled, other nodes receive some operational parameters from a central node and calculate other operational parameters in a distributed manner, and still further nodes operate in a completely distributed manner communicating only with ancestor and/or children nodes. Thus, embodiments of the present invention should be considered in all respects as illustrative and not restrictive. Accordingly, the scope of the invention should be determined not by the embodiments illustrated, but by the appended claims and their equivalents.

What is claimed is:

1. A node controller, comprising:
a network interface;
a processor;
a memory containing:
a distributed power control application and a plurality of node operating parameters;
wherein the distributed power control application, when executed by the processor, is configured to:
model a power distribution network as a radial network comprising a plurality of nodes and lines connecting the nodes, wherein node controllers are associated with processing nodes among the plurality of nodes, and the plurality of nodes include at least one of power stations, substations, distributed power generation, and end user loads, and wherein the lines of the radial network include transmission and distribution lines, and the plurality of nodes in the radial network comprise at least one ancestor node and at last one child node;
calculate an optimal power flow for the power distribution network by performing a closed form solution that creates sub-problems solved concurrently by the node controllers of the processing nodes using the node operating parameters that include power injections, voltages, load impedances, branch currents, and branch power flows of the power distribution network that are determined by the node controllers of the processing nodes;
wherein creating sub-problems comprises decoupling nodes and partitioning the radial network into even and odd layers, and wherein solving the sub-problems further comprises using an iterative process of alternating method of multipliers (ADMM) comprising minimizing an augmented Lagrangian for an augmented relaxed optimal power flow (ROPF) expression in the closed form solution to calculate updated node operating parameters using the determined node operating parameters which are sent and received as requested and required between the node controller and its ancestor and children nodes for the concurrent solving;
and
perform at least one of changing voltages in the power distribution network, redistributing bulk power in the power distribution network, and controlling power or voltage injections to the power distribution network, based on the optimal power flow calculation.

2. The node controller of claim 1, wherein the ADMM process further comprises an x-update process, wherein the x-update process comprises minimizing an augmented Lagrangian for an augmented Relaxed Optimal Power Flow (ROPF) expression.

3. The node controller of claim 2, wherein the x-update process is subject to the following constraints:

$$v_{A_i,i}^{(l)} = v_i^{(l)} - 2(r_i P_i^{(l)} + x_i Q_i^{(l)}) + \ell_i^{(l)}(r_i^2 + x_i^2)$$

$$\sum_{j\in C_i}(P_{j,i}^{(l)} - \ell_{j,i}^{(l)}r_j) + p_i^{(l)} = p_i^{(l)}$$

$$\sum_{j\in C_i}(Q_{j,i}^{(l)} - \ell_{j,i}^{(l)}x_j) + q_i^{(l)} = Q_i^{(l)}$$

Where v is a magnitude squared of a complex voltage, r is a real portion and x is an imaginary portion of a complex impedance, P is a real portion and Q is an imaginary portion of a branch power flow, l is a magnitude squared of the complex branch current, l is a layer number, $C_i$ is a set of child nodes, i is the node, j is the child node, and $A_i$ is the ancestor node.

4. The node controller of claim 1, wherein the ADMM process further comprises a z-update process, wherein the z-update process comprises minimizing an augmented Lagrangian for an augmented Relaxed Optimal Power Flow (ROPF) expression.

5. The node controller of claim 4, wherein the z-update process further comprises calculating a closed form expression of an independent subexpression.

6. The node controller of claim 1, wherein the ADMM process further comprises a Lagrange multiplier update process, wherein the Lagrange multiplier update expression comprises a set of Lagrange multipliers.

7. The node controller of claim 6, wherein each Lagrange multiplier in the set of Lagrange multipliers is evaluated by the processor using the following expression:

$$\lambda^{k+1} = \lambda^k + \rho(Ax^{k+1} + Bz^{k+1} - c)$$

where $\lambda$ is a Lagrange multiplier in the set of Lagrange multipliers, $\rho$ is a constant, Ax+Bz−c is a constraint, k is current iteration, and k+1 is a next iteration.

8. The node controller of claim 1, wherein the updated node operating parameters are further calculated using the node operating parameters that describe a set of operating parameters of at least one further connected node selected from the group consisting of an ancestor node of the ancestor node and at least one child node of the at least one child node.

9. The node controller of claim 1, wherein the node operating parameters include power injection, voltage, branch current to the ancestor node, and branch power flow to the ancestor node.

10. A power distribution network, comprising:
one or more centralized computing systems;
a communications network;
a plurality of node controllers, wherein each node controller in the plurality of node controllers contains:
a network interface;
a node processor; and
a memory containing:
a distributed power control application and a plurality of node operating parameters;
wherein the distributed power control application, when executed by the node processor, is configured to:
model the power distribution network as a radial network comprising a plurality of nodes and lines connecting the nodes, wherein the node controllers are associated with processing nodes among the plurality of nodes, and the plurality of nodes include at least one of power stations, substations, distrusted power generation, and end user loads, and wherein the lines of the radial network include transmission and distribution lines, and the plurality of nodes in the radial network comprise at least one ancestor node and at last one child node;
calculate an optimal power flow for the power distribution network by performing a closed form solution that creates sub-problems solved concurrently by the node controllers of the processing nodes using the node operating parameters that include power injections, voltages, load impedances, branch currents, and branch power flows of the power distribution network that are determined by the node controllers of the processing nodes;
wherein creating sub-problems comprises decoupling nodes and partitioning the radial network into even and odd layers, and wherein solving the sub-problems further comprises using an iterative process of alternating method of multipliers (ADMM) comprising minimizing an augmented Lagrangian for an augmented relaxed optimal power flow (ROPF) expression in the closed form solution to calculate updated node operating parameters using the determined node operating parameters which are sent and received as requested and required between the node controller and its ancestor and children nodes for the concurrent solving;
and
perform at least one of changing voltages in the power distribution network, redistributing bulk power in the power distribution network, and controlling power or voltage injections to the power distribution network, based on the optimal power flow calculation.

11. The power distribution network of claim 10, wherein the iterative process is part of a distributed process for achieving Optimal Power Flow (OPF) that is simplified using a convex relaxation.

12. The power distribution network of claim 11, wherein the convex relaxation is a second order cone program (SOCP).

13. The power distribution network of claim 10, wherein the node controllers are modeled in the centralized computing system using Kirchhoffs laws.

14. The power distribution network of claim 10, wherein the node controllers are modeled in the centralized computing system using a branch flow model.

15. The power distribution network of claim 10, wherein the ADMM process further comprises an x-update process, wherein the x-update process comprises minimizing an augmented Lagrangian for an augmented Relaxed Optimal Power Flow (ROPF) expression.

16. The power distribution network of claim 15, wherein the x-update process is subject to the following constraints:

$$v_{A_i,i}^{(l)} = v_i^{(l)} - 2(r_i P_i^{(l)} + x_i Q_i^{(l)}) + \ell_i^{(l)}(r_i^2 + x_i^2)$$

$$\sum_{j \in C_i} (P_{j,i}^{(l)} - \ell_{j,i}^{(l)} r_j) + p_i^{(l)} = p_i^{(l)}$$

$$\sum_{j \in C_i} (Q_{j,i}^{(l)} - \ell_{j,i}^{(l)} x_j) + q_i^{(l)} = Q_i^{(l)}$$

where v is a magnitude squared of a complex voltage, r is a real portion and x is an imaginary portion of a complex impedance, P is a real portion and Q is an imaginary portion of a branch power flow, l is a magnitude squared of the complex branch current, l is a layer number, $C_i$ is a set of child nodes, i is the node, j is the child node, and $A_i$ is the ancestor node.

17. The power distribution network of claim 10, wherein the ADMM process further comprises a z-update process, wherein the z-update process comprises minimizing an augmented Lagrangian for an augmented Relaxed Optimal Power Flow (ROPF) expression.

18. The power distribution network of claim 17, wherein the z-update process further comprises calculating a closed form expression of an independent subexpression.

19. The power distribution network of claim 10, wherein the ADMM process further comprises a Lagrange multiplier update process, wherein the Lagrange multiplier update expression comprises a set of Lagrange multipliers.

20. The power distribution network of claim 19, wherein each Lagrange multiplier in the set of Lagrange multipliers is evaluated by the processor using the following expression:

$$\lambda^{k+1} = \lambda^k + \rho(Ax^{k+1} + Bz^{k+1} - c)$$

where $\lambda$ is a Lagrange multiplier in the set of Lagrange multipliers, $\rho$ a constant, $Ax+Bz-c$ is a constraint, k is current iteration, and k+1 is a next iteration.

21. The power distribution network of claim 10, wherein the updated node operating parameters are further calculated using the node operating parameters that describe a set of operating parameters of at least one further connected node selected from the group consisting of an ancestor node of the ancestor node and at least one child node of the at least one child node.

22. The power distribution network of claim 10, wherein the node operating parameters include power injection, voltage, branch current to the ancestor node, and branch power flow to the ancestor node.

* * * * *